(12) United States Patent
Hori et al.

(10) Patent No.: US 6,460,639 B1
(45) Date of Patent: Oct. 8, 2002

(54) DRIVING CONTROL DEVICE FOR VEHICLE DEVICE

(75) Inventors: Shuuji Hori; Masayoshi Mototani, both of Oyama (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/592,946

(22) Filed: Jun. 13, 2000

(30) Foreign Application Priority Data

Jun. 28, 1999 (JP) ............................................. 11-181827

(51) Int. Cl.[7] .............................................. B62D 11/00
(52) U.S. Cl. ........................................ 180/6.2; 180/333
(58) Field of Search .............................. 180/6.2, 6.48, 180/6.66, 308, 333; 74/471 XY

(56) References Cited

U.S. PATENT DOCUMENTS

| | | | | |
|---|---|---|---|---|
| 3,666,034 A | * | 5/1972 | Stuller et al. ............... | 180/6.48 |
| 5,293,900 A | * | 3/1994 | Karbassi et al. ............ | 137/554 |
| 5,429,037 A | * | 7/1995 | Weber et al. ................. | 91/522 |
| 5,497,847 A | * | 3/1996 | Ota et al. ..................... | 180/333 |
| 5,566,586 A | * | 10/1996 | Lauer et al. .................. | 74/523 |
| 5,816,348 A | * | 10/1998 | Barnes ......................... | 180/602 |
| 5,938,282 A | * | 8/1999 | Epple ....................... | 297/217.3 |
| 6,213,244 B1 | * | 4/2001 | Waggoner et al. .......... | 180/333 |
| 6,259,433 B1 | * | 7/2001 | Meyers ........................ | 345/161 |
| 6,328,127 B1 | * | 12/2001 | Hori et al. ................... | 180/333 |

* cited by examiner

Primary Examiner—Anne Marie Boehler
Assistant Examiner—Tony Winner
(74) Attorney, Agent, or Firm—Varndell & Varndell, PLLC

(57) ABSTRACT

A driving control device for a vehicle device, which has an operation lever device for outputting a signal to instruct a travelling speed and a traveling direction of a vehicle by tilting a single operation lever forward, backward, left and right, and a hydraulic motor controller for controlling rotation speeds of two hydraulic motors for driving respective traveling devices on left and right sides of the vehicle body according to the signal from the operation lever device, and which controls the traveling of the vehicle device by operating the operation lever of the operation lever device, has a spin turn instruction member which outputs a signal to make the two hydraulic motors have the same rotation speed but in different rotation directions from each other by rotating the operation lever of the operation lever device.

4 Claims, 21 Drawing Sheets

DRIVING CONTROL DEVICE FOR VEHICLE DEVICE

BACKGROUND OF THE INVENTION

1. Field of the Invention

The present invention relates to a driving control device for a vehicle device to control the traveling of the vehicle device by tilting a single operation lever of an operation lever device forward, backward, right or left.

2. Description of the Related Art

For example, a driving control device for a vehicle device, which controls traveling of a vehicle device such as a bulldozer by tilting a single operation lever, is already know.

FIG. 16 shows an example of a driving control device for a conventional bulldozer (vehicle device). FIGS. 17(a) and 17(b) show appearance of the operation lever device configuring the above driving control device, and FIG. 18 shows an inside structure of the operation lever device.

It is seen from FIG. 18 that operation lever device 205 has device body 207 and operation lever 206 which is mounted to be tiltable on the device body 207 through universal joint 250.

The universal joint 250 is provided with piece member 213 which has support shaft 209 and support shaft 210 mutually intersecting at right angles as shown in FIG. 19. The piece member 213 is connected to forked bracket 212 fixed to mounting plate 211 through the support shaft 210. The operation lever 206 is connected to the piece member 213 through the support shaft 209.

The operation lever 206 can be tilted in two directions so to mutually intersect at right angles with the device body 207 through the universal joint 250 as described above.

The device body 207 has four pistons 201, 202, 203, 204, a housing for accommodating the pistons 201 to 204 and mounting plate 211.

The device body 207 has top ends of the four pistons 201, 202, 203, 204 protruded, from the top mounting plate 211. The four pistons 201 to 204 are disposed to form a square when viewed from above as shown in FIG. 17(a).

Disk plate 208 having a substantially disk form is connected to the operation lever 206. The disk plate 208 has its undersurface contacted with the top ends of the respective pistons 201, 202, 203, 204 when the operation lever 206 is neutral.

The term neutral is used to mean a state that pressure reducing valves 218 to 221 do not output a signal in FIG. 16. Generally, it is configured that the operation lever 206 is parallel to the respective pistons 201, 202, 203, 204 and perpendicular to the mounting plate 211 as shown in FIG. 18.

Accordingly, when the operation lever is tilted, the respective pistons 201, 202, 203, 204 are moved according to a tilted direction and amount of the operation lever 206.

As shown in FIG. 16, the operation lever device 205 is supplied with a pilot pressure oil from fixed displacement hydraulic pump 222. Relief valve 222V and tank 223 are connected to the operation lever device 205.

The pistons 201, 202, 203, 204 are respectively provided with the pressure reducing valves 218, 219, 220, 221 via an unshown set spring. Output ports of the pressure reducing valves 218, 219, 220, 221 are connected to the pilot pipe passages 214, 215, 216, 217 respectively.

Next, the operation will be described with reference to FIG. 18. When the operation lever 206 which is in the neutral position is tilted about the support shaft 209 to the left in the drawing (in a direction of forward F), the piston 204 is pushed down in a direction of arrow A by the disk plate 208.

Then, stroke S (displacement) of the piston 204 has a magnitude corresponding to a tilted amount of the operation lever 206.

When the piston 204 is pushed down, the pressure reducing valve 218 increases its opening area through the set spring. The pressure reducing valve 218 outputs a pilot pressure corresponding to the opening area to the pilot pipe passage 214.

The opening area of the pressure reducing valve 218 is determined depending on a balance between the output pilot pressure and the spring tension. The spring tension in the balance position corresponds to stroke S. Therefore, pilot pressure Pp output from the pilot pipe passage 214 has the magnitude corresponding to the tilted amount of the operation lever 206.

FIG. 20 shows a relation between the stroke S and the pilot pressure Pp. When the operation lever 206 is operated to move the piston 204 from stroke position S0 corresponding to the neutral position shown in FIG. 18 to position SF to output maximum output Ppmax, the pilot pressure Pp output from the pilot pipe passage 214 is variable from drain pressure Pp0 of the tank 223 to set pressure Ppmax of the relief valve 222V.

It is designed that when the piston 204 reaches position SF to output the maximum output Ppmax, the operation lever 206 stops its stroke and its further movement is restricted.

The zone between the stroke position S0 and position Si is a dead zone, in which the pilot pressure Pp output from the pilot pipe passage 214 remains to be drain pressure Pp0 and does not change even if the operation lever 206 is tilted.

It was described above that the piston 204 is moved according to the tilting of the operation lever 206, and the oil pressure signal indicating the pilot pressure Pp is output from the pilot pipe passage 214. The oil pressure signal indicating the pilot pressure Pp is also output from the pilot pipe passages 215, 216, 217 in the same way when the pistons 201, 202, 203 are moved according to the titling of the operation lever 206.

The bulldozer having the driving control device of FIG. 16 is provided with left crawler 236 and right crawler 238 on the left and right sides of its body. The left crawler 236 is driven by left traveling hydraulic motor 235. The right crawler 238 is driven by right traveling hydraulic motor 237.

The left traveling hydraulic motor 235 is an actuator for operating the left crawler 236 in two directions, namely forward and backward. The right traveling hydraulic motor 237 is an actuator for operating the right crawler 238 in two directions, namely forward and backward.

The operation lever device 205 is connected to swash plate control cylinders 230, 231 for left and right variable displacement hydraulic pumps 233, 234 through drive signal generation circuit 229. The left and right for variable displacement hydraulic pumps 233, 234 are connected to the left and right hydraulic motors 235, 237 respectively.

The drive signal generation circuit 229 comprises shuttle valves 225, 226, 227, 228 for comparing oil pressure signals output from the two neighboring pistons (203 and 204, 204 and 201, 201 and 202 or 202 and 203) to output a signal of a larger pressure.

The pilot pipe passage 214 is connected to port F which is an inlet port for either of the shuttle valves 225, 226.

Similarly, the pilot pipe passage 215 is connected to port B. The pilot pipe passage 216 is connected to port R. The pilot pipe passage 217 is connected to inlet port L.

Outlet port of the shuttle valve 225 is connected to cylinder chamber 230F of the swash plate control cylinder 230. Outlet port of the shuttle valve 226 is connected to cylinder chamber 231F of the swash plate control cylinder 231. Outlet port of the shuttle valve 227 is connected to cylinder chamber 231B of the swash plate control cylinder 231. Outlet port of the shuttle valve 228 is connected to cylinder chamber 230B of the swash plate control cylinder 230.

Pressure oil supplied to the cylinder chamber 230F tilts the swap plate of the variable displacement hydraulic pump 233 to make a forward rotation of the left traveling hydraulic motor 235 so to move forward the left crawler 236. The pressure oil supplied to the cylinder chamber 230B tilts the variable displacement hydraulic pump 233 to make backward rotation of the left traveling hydraulic motor 235 so to move backward the left crawler 236.

Similarly, the pressure oil supplied to the cylinder chamber 231F tilts the swash plate of the variable displacement hydraulic pump 234 to make a forward rotation of the right traveling hydraulic motor 237 so to move forward the right crawler 238. The pressure oil supplied to the cylinder chamber 231B tilts the swash plate of the variable displacement hydraulic pump, 234 to make backward rotation of the right traveling hydraulic motor 237 so to move backward the right crawler 238.

The variable displacement hydraulic pump 233, the variable displacement hydraulic pump 234 and the fixed displacement hydraulic pump 222 are driven by engine 232.

Thus, the left and right traveling hydraulic motors 235, 237 are driven according to the pressure of the oil pressure signal Pp generated by the operation lever device 205.

Therefore, the left and right traveling hydraulic motors 235, 237 can be driven in the direction of rotation according to the tilted direction of the operation lever 206 and driven at a speed according to the tilted amount of the operation lever 206 so to operate the left and right crawlers 236, 238 respectively.

Next, the movements of a vehicle will be described. FIG. 21 shows the movements of the vehicle (bulldozer) in correspondence with the tilted directions of the operation lever 206.

Tilting of the operation lever 206 from the neutral position in forward (straight) direction F will be described.

At this time, only the piston 204 of the operation lever device 205 is moved. Therefore, the oil pressure signal Pp is output from the pilot pipe passage 214 only. The oil pressure signal Pp is entered the drive signal generation circuit 229 and input to the shuttle valves 225, 226.

At this time, because the pilot pressure is not applied to the inlet ports L, R, the oil pressure signal Pp is output from the shuttle valves 225, 226.

A drive signal (pilot pressure) corresponding to the forward movement direction of the left traveling hydraulic motor 235 is output from the shuttle valve 225. The output pilot pressure oil is supplied to the cylinder chamber 230F corresponding to the left traveling forward movement of the swash plate control cylinder 230.

Similarly, a drive signal (pilot pressure) corresponding to the forward movement direction of the right traveling hydraulic motor 237 is output from the shuttle valve 226. The output pilot pressure oil is supplied to the cylinder chamber 231F corresponding to the right traveling forward movement of the swash plate control cylinder 231.

Thus, the swash plate of the left traveling hydraulic pump 233 is changed to a tilted angle corresponding to the forward movement. The left traveling hydraulic pump 233 ejects the pressure oil according to the tilted angle. The pressure oil ejected from the left traveling hydraulic pump 233 is supplied to a supply port corresponding to the forward movement of the left traveling hydraulic motor 235.

Similarly, the swash plate of the right traveling hydraulic pump 234 is changed to a tilted angle corresponding to the forward movement. The right traveling hydraulic pump 234 ejects the pressure oil according to the tilted angle. The pressure oil ejected from the right traveling hydraulic pump 234 is supplied to a supply port corresponding to the forward movement of the right traveling hydraulic motor 237.

Here, pressures output from the shuttle valves 225, 226 are the same. Therefore, the tilted angles are also the same. Amounts of flow of the pressure oils supplied to the left and right traveling hydraulic motors 235, 237 are the same because the amounts of flow of the pressure oils ejected from the left and right traveling hydraulic pumps 233, 234 become the same.

Therefore, the left and right traveling hydraulic motors 235, 237 are rotated at the same speed. As a result, the left and right crawlers 236, 238 are driven in the forward direction at the same speed, so that the vehicle (bulldozer) moves forward (straight) as indicated by arrow F in FIG. 21. The vehicle speed corresponds to the tilted amount of the operation lever 206.

Similarly, when the operation lever 206 is tilted in any direction, a drive signal corresponding to the tilted direction of the lever is output from the respective shuttle valves 225 to 228 of the drive signal generation circuit 229.

When the operation lever 206 is tilted in backward (straight) direction B, only the piston 202 of the operation lever device 205 is moved. Therefore, the oil pressure signal Pp is output from only the pilot pipe passage 215. The oil pressure signal Pp is entered the drive signal generation circuit 229 and input to the shuttle valves 227, 228.

At this time, the oil pressure signal Pp is output from the shuttle valves 227, 228 because the pilot pressure does not act on the inlet ports L, R.

A drive signal (pilot pressure) corresponding to the backward direction of the right traveling hydraulic motor 237 is output from the shuttle valve 227. The output pilot pressure oil is supplied to the cylinder chamber 231B corresponding to right traveling backward movement of the swash plate control cylinder 231.

Similarly, a drive signal (pilot pressure) corresponding to the backward movement direction of the left traveling hydraulic motor 235 is output-from the shuttle valve 228. The output pilot pressure oil is supplied to the cylinder chamber 230B corresponding to the left traveling backward movement of the swash plate control cylinder 230.

Thus, the swash plate of the right traveling hydraulic pump 234 is changed to a tilted angle corresponding to the backward movement. The right traveling hydraulic pump 234 ejects the pressure oil corresponding to the tilted angle. The pressure oil ejected from the right traveling hydraulic pump 234 is supplied to a supply port corresponding to the backward movement side of the right traveling hydraulic motor 237.

Similarly, the swash plate of the left traveling hydraulic pump 233 is changed to a tilted angle corresponding to the backward movement. The left traveling hydraulic pump 233 ejects a pressure oil corresponding to the tilted angle. The pressure oil ejected from the left traveling hydraulic pump 233 is supplied to a supply port corresponding to the backward movement side of the left traveling hydraulic motor 235.

Here, pressures output from the shuttle valves 227, 228 are the same. Therefore, the tilted angles are also the same. Amounts of flow ejected by the left and right traveling hydraulic pumps 233, 234 are the same, so that the amounts of flow supplied to the left and right traveling hydraulic motors 235, 237 are the same.

Therefore, the left and right traveling hydraulic motors 235, 237 rotate at the same speed. As a result, the left and right crawlers 236, 238 are driven in the backward direction at the same speed, and the vehicle (bulldozer) moves backward (straight) as indicated by arrow B in FIG. 21.

When the operation lever 206 is tilted in right direction R, only the piston 201 of the operation lever device 205 is moved. Therefore, the oil pressure signal Pp is output from the pilot pipe passage 216 only. The oil pressure signal Pp is entered the drive signal generation circuit 229 and input to the shuttle valves 226, 227.

At this time, the pilot pressure does not act on the inlet ports F, B, so that the oil pressure signal Pp is output from the shuttle valves 226, 227.

The pilot pressure oil output from the shuttle valve 226 is supplied to the cylinder chamber 231F of the swash plate control cylinder 231. The pilot pressure oil output from the shuttle valve 227 is supplied to the cylinder chamber 231B of the swash plate control cylinder 231. Therefore, the swash plate control cylinder 231 does not operate.

And, the pilot pressure does not act on the cylinder chambers 230F, 230B of the swash plate control cylinder 230, so that the swash plate control cylinder 230 does not operate either.

Therefore, both the left and right crawlers 236, 238 do not operate, and the vehicle (bulldozer) stops.

When the operation lever 206 is tilted in left direction L, only the piston 203 of the operation lever device 205 is moved. Therefore, the oil pressure signal Pp is output from the pilot pipe passage 217 only. This oil pressure signal Pp is entered the drive signal generation circuit 229 and input to the shuttle valves 225, 228.

At this time, the pilot pressure does not act on the inlet ports F, B, so that the oil pressure signal Pp is output from the shuttle valves 225, 228.

The pilot pressure oil output from the shuttle valve 225 is supplied to the cylinder chamber 231F of the swash plate control cylinder 230. The pilot pressure oil output from the shuttle valve 228 is supplied to the cylinder chamber 230B of the swash plate control cylinder 230. Therefore, the swash plate control cylinder 230 does not operate.

And, the pilot pressure does not act on the cylinder chambers 231F, 231B of the swash plate control cylinder 231, so that the swash plate control cylinder 231 does not operate either.

Therefore, both the left and right crawlers 236, 238 do not operate, and the vehicle (bulldozer) stops.

Thus, when the operation lever 206 is tilted in forward direction F, the vehicle moves forward (straight). When the operation lever 206 is tilted in backward direction B, the vehicle moves backward (straight). When the operation lever 206 is tilted in right direction R, the vehicle stops moving. When the operation lever 206 is tilted in left direction L, the vehicle stops moving.

When the operation lever 206 is tilted in a direction to the midpoint between the directions F and R, the vehicle makes a forward right turn. When the operation lever 206 is tilted in a direction to the midpoint between the directions R and B, the vehicle makes a backward left turn. When the operation lever 206 is tilted in a direction to the midpoint between the directions B and L, the vehicle makes a backward right turn. And, when thee operation lever 206 is tilted in a direction to the midpoint between the directions L and F, the vehicle makes a forward left turn.

The driving control device for the vehicle device described above could not turn the vehicle on the spot, so-called spin tun, by operating the left crawler 236 and the right crawler 238 at the same speed but in opposite directions from each other.

As a driving control device enabling the spin turn of a vehicle, there is a driving control device shown in FIG. 22 used for a vehicle such as a skid steering loader.

In FIG. 22, like reference numerals designate like or corresponding elements of FIG. 16, and their detailed descriptions are omitted.

The vehicle such as a skid steering loader has an operation pattern by the operation lever 206 different from that of the vehicle such as a bulldozer. Therefore, the connection of the oil pressure pipe passages between the drive signal generation circuit 229 and the swash plate control cylinders 230, 231 is partly different from that of the driving control device shown in FIG. 16.

Specifically, in the driving control device shown in FIG. 22, the outlet port of the shuttle valve 225 in the drive signal generation circuit 229 is connected to the cylinder chamber 231F of the swash plate control cylinder 231. The outlet port of the shuttle valve 226 is connected to the cylinder chamber 230F of the swash plate control cylinder 230.

Movements of the vehicle (skid steering loader) having the driving control device described above will be described in correspondence with tilted directions of the operation lever 206 with reference to FIG. 23.

When the operation lever 206 is tilted in forward movement direction F, the vehicle moves forward (straight ahead) and when it is tilted in backward direction B, the vehicle moves backward (straight).

When the operation lever 206 is tilted in right spin turn direction R, only the piston 201 of the operation lever device 205 is moved. Therefore, the oil pressure signal Pp is output a from the pilot pipe passage 216 only. This oil pressure signal Pp is entered the drive signal generation circuit 229 and input to the shuttle valves 226, 227.

At this time, the pilot pressure does not,act on the inlet ports F, B, so that the oil pressure signal Pp is output from the shuttle valves 226, 227.

A drive signal (pilot pressure) corresponding to the forward direction of the left traveling hydraulic motor 235 is output from the shuttle valve 226. The output pilot pressure oil is supplied to the cylinder chamber 230F corresponding to the left traveling forward movement of the swash plate control cylinder 230.

Similarly, a drive signal (pilot pressure) corresponding to the backward direction of the right traveling hydraulic motor 237 is output from the shuttle valve 227. The output pilot pressure oil is supplied to the cylinder chamber 231B corresponding to the right traveling backward movement of the swash plate control cylinder 231.

Thus, the swash plate of the left traveling hydraulic pump 233 is switched to a tilted angle corresponding to the forward movement. The left traveling hydraulic pump 233 ejects the pressure oil according to the tilted angle. The pressure oil ejected from the left traveling hydraulic pump 233 is supplied to a supply port corresponding to the forward movement side of the left traveling hydraulic motor 235.

Similarly, the swash plate of the right traveling hydraulic pump 234 is switched to a tilted angle corresponding to the backward movement. The right traveling hydraulic pump 234 ejects a pressure oil according to the tilted angle. The pressure oil ejected from the right traveling hydraulic pump 234 is supplied to a supply port corresponding to the backward movement side of the right traveling hydraulic motor 237.

Here, the pressures output from the shuttle valves 226, 227 are the same. Accordingly, the tilted angles are also the same. Amounts of flow supplied to the left and right traveling hydraulic motors 235, 237 are the same because the amounts of flow ejected by the left and right hydraulic pumps 233, 234 become the same.

Therefore, the left and right traveling hydraulic motors 235, 237 rotate at the same speed but in opposite directions. As a result, the left crawler 236 moves in the forward direction while the right crawler 238 moves in the backward direction, so that the vehicle (bulldozer) makes a right spin turn.

When the operation lever 206 is tilted in left spin turn direction L, only the piston 203 of the operation lever devil 205 is moved. Accordingly, the oil pressure signal Pp is output from the pilot pipe passage 217 only. This oil pressure signal Pp is entered the drive signal generation circuit 229 and input to the shuttle valves 225, 228.

At this time, the pilot pressure does not act on the inlet ports F, B. so that the oil pressure signal Pp is output from the shuttle valves 225, 228.

A drive signal (pilot pressure) corresponding to the forward movement direction of the right traveling hydraulic motor 237 is output from the shuttle valve 225. The output pilot pressure oil is supplied to the cylinder chamber 231F corresponding to the right traveling forward movement of the swash plate control cylinder 231.

Similarly, a drive signal (pilot pressure) corresponding to the backward direction of the left traveling hydraulic motor 235 is output from the shuttle valve 228. The output pilot pressure oil is supplied to the cylinder chamber 230B corresponding to the left traveling backward movement of the swash plate control cylinder 230.

Thus, the swash plate of the right traveling hydraulic pump 234 is changed to a tilted angle corresponding to the forward movement. The right traveling hydraulic pump 234 ejects the pressure oil according the tilted angle. The pressure oil ejected from the right traveling hydraulic pump 234 is supplied to a supply port corresponding to the forward movement side of the right traveling hydraulic motor 237.

Similarly, the swash plate of the left traveling hydraulic pump 233 is switched to a tilted angle corresponding to the backward movement. The left traveling hydraulic pump 233 ejects the pressure oil according to the tilted angle. The pressure oil ejected from the left traveling hydraulic pump 233 is supplied to a supply port corresponding to the backward movement side of the left traveling hydraulic motor 235.

Here, the pressures output from the shuttle valves 225, 228 are the same. Accordingly, the tilted angles are also the same. Amounts of flow supplied to the left and right traveling hydraulic motors 235, 237 become the same because the a mounts of flow ejected from the left and right traveling hydraulic pumps 233, 234 become the same.

Therefore, the left and right traveling hydraulic motors 235, 237 rotate at the same speed but in opposite directions. As a result, the right crawler 238 moves in the forward direction while the left crawler 236 moves in the backward direction, so that the vehicle (bulldozer) makes a left spin turn.

And, when the operation lever 206 is tilted in a direction to the midpoint between the directions F and R, the vehicle makes a forward right turn. And, when the operation lever 206 is tilted in a direction to the midpoint between the directions R and B, the vehicle makes a backward right turn.

When the operation ever 206 is tilted in a direction to the midpoint between the directions B and L, the vehicle makes a backward left turn. And, when the operation lever 206 is tilted in a direction to the midpoint between the directions L and F, the vehicle makes a forward left turn.

By the driving control device described above, the vehicle can make a spin turn by operating the operation lever 206.

However, the driving control device shown in FIGS. 22, 23 has an operation pattern (hereinafter called the skid pattern) that when the vehicle is moved backward, a relation between the tilting direction of the operation lever 206 and the traveling direction (turning direction) of the vehicle is reversed.

The skid patterns 5 own in FIGS. 22 and 3 are different from the operation patterns (hereinafter called the bull-pattern) of the driving control device of the bulldozer shown in FIGS. 17 and 21. Therefore, an operator skilled in the operation of the bulldozer has a different operation feeling about the skid pattern.

SUMMARY OF THE INVENTION

It is an object of the present invention to provide a driving control device for a vehicle device, which can make a spin turn of a vehicle without changing the bull-pattern.

To achieve the above object, the invention described in claim 1 is a driving control device for a vehicle device which has an operation lever device (1) for outputting a signal to instruct a traveling speed and a traveling direction of a vehicle by tilting a single operation lever (40) forward, backward, left and right, and hydraulic motor control means (6, 8) for controlling rotation speeds and rotation directions of two hydraulic motors (3L, 3R) for driving respective traveling devices (2L, 2R) on left and right sides of the vehicle body according to the signal from the operation lever device (1), and which controls the traveling of the vehicle device by operating the operation lever (40) of the operation lever device (1), wherein the driving control device comprises:

spin turn instruction means (140) which outputs a signal to make the two hydraulic motors (3L, 3R) have the same rotation speed but in different rotation directions from each other by rotating the opera ion lever (40) of the operation lever device (1).

According to the invention described in claim 1, the spin turn of the vehicle can be made by turning the operation lever by following the bull-pattern of the operation lever device.

The invention described in claim 2 is the invention of claim 1, wherein the spin turn instruction means (140) outputs the signal only when the operation lever (40) of the operation lever device (1) is in a neutral position with respect to tilting directions.

According to the invention described in claim 2, the spin turn of the vehicle can be made only when the operation lever is in the neutral position.

The invention described in claim 3 is the invention of claim 1, wherein the spin turn instruction means (140) is provided with a changeover switch (180) to output the signal according to a state of the changeover switch (180) and a tilting operation of the operation lever (40) of the operation lever device (1).

According to the invention described in claim 3, the vehicle can make a spin turn on the basis of the state of the changeover switch and the tilting operation of the operation lever upon following the bull-pattern of the operation lever device.

The invention described in claim 4 is the invention described in any of claims 1 to 3, wherein the spin turn instruction means (140, 190) provides a dead band in a predetermined tilting range from the neutral position of the operation lever (40) of the operation lever device (1).

According to the invention described in claim 4, when the spin turn is instructed by the operation lever device, the operation lever is operated with play because the dead band was disposed in a predetermine tilting range from the neutral position of the operation lever, and a signal is not output when the operation lever is tilted just a little. Therefore, good operability can be obtained without requiring a delicate operation of the operation lever.

DETAILED DESCRIPTION OF THE EMBODIMENTS

Figure 1:
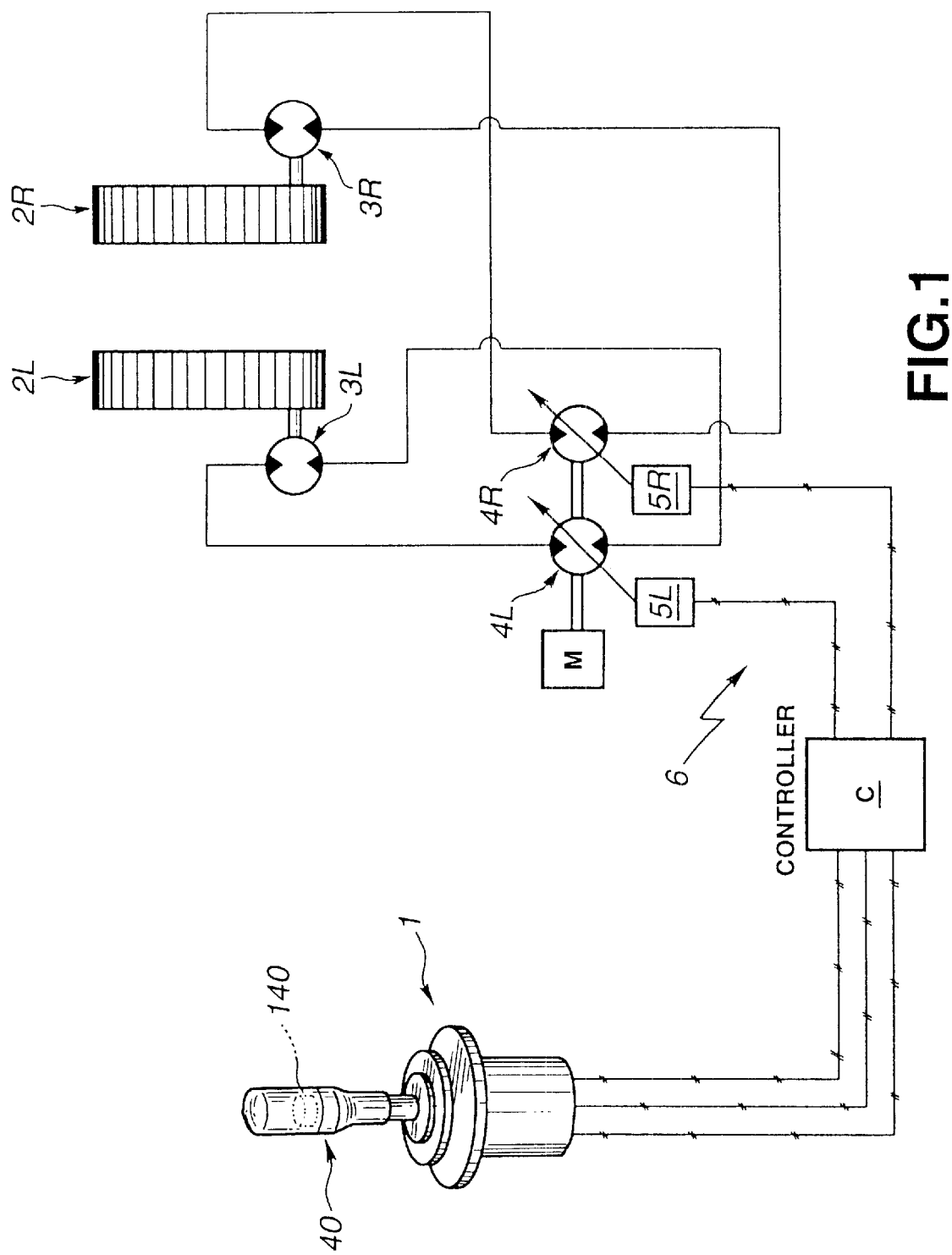
FIG. 1 is a concept diagram showing a driving control device for a vehicle device to which the present invention pertains.

FIG. 1 is a concept diagram showing a driving control device for a vehicle device to which the present invention pertains. This driving control device is provided with operation lever device 1 which output a signal instructing a traveling speed and a traveling direction of a vehicle by tilting single operation lever 40 in forward, backward, right and left directions.

A bulldozer (vehicle device) on which this driving control device is mounted has left crawler 2L and right crawler 2R as traveling device. The left crawler 2L is driven to operate by left traveling hydraulic moor 3L. The right crawler 2R is driven to operate by right traveling hydraulic motor 3R.

The left traveling hydraulic motor 3L is an actuator for moving the left crawler 2L in two directions, namely forward and backward. The right traveling hydraulic motor 3R is an actuator for moving the right crawler 2R in two directions, namely forward and backward. Variable displacement left traveling hydraulic pump 4L is connected to the left traveling hydraulic motor 3L in a closed circuit. And, variable displacement right traveling hydraulic pump 4R is connected to the right traveling hydraulic motor 3R in a closed circuit.

The driving control device of the present invention has hydraulic motor control means 6 for controlling rotation speeds and rotation directions of the left and right traveling hydraulic motors 3L, 3R according to a signal from the operation lever device 1.

The hydraulic motor control means 6 has servo mechanism 5L for controlling a swash plate of the left traveling hydraulic pump 4L and servo mechanism 5R for controlling a swash plate of the right traveling hydraulic pump 4R.

The hydraulic motor control means 6 further has controller C. This controller C converts electric signals in F-B directions, R-L directions, and turning directions around the axis (to be described afterward) output from the operation lever device 1 according to the operation of the operation lever 40. And a signal for controlling to operate the servo mechanism 5L and the servo mechanism 5R is output in order to run the vehicle in correspondence with the operation of the operation lever 40.

When the operation lever 40 of the operation lever device 1 is operated, the swash plate of the left traveling hydraulic pump 4L and the swash plate of the right traveling hydraulic pump 4R are controlled to rove by the hydraulic motor control means 6. The rotation speeds and rotation directions of the left traveling hydraulic motor 3L and the right traveling hydraulic motor 3R are controlled, so that the traveling speed and direction of the bulldozer (vehicle device) are controlled.

And, the operation lever device 1 has third potentiometer 140 configuring the spin turn instruction means. The third potentiometer 140 outputs a signal for rotating at the same speed in different rotation directions the left traveling hydraulic motor 3L and the right traveling hydraulic motor 3: according to the operation lever 40 rotated.

Specifically, the operation lever 40 of the operation lever device 1 can be moved circularly to make a spin turn of the bulldozer (vehicle device).

Figure 2:
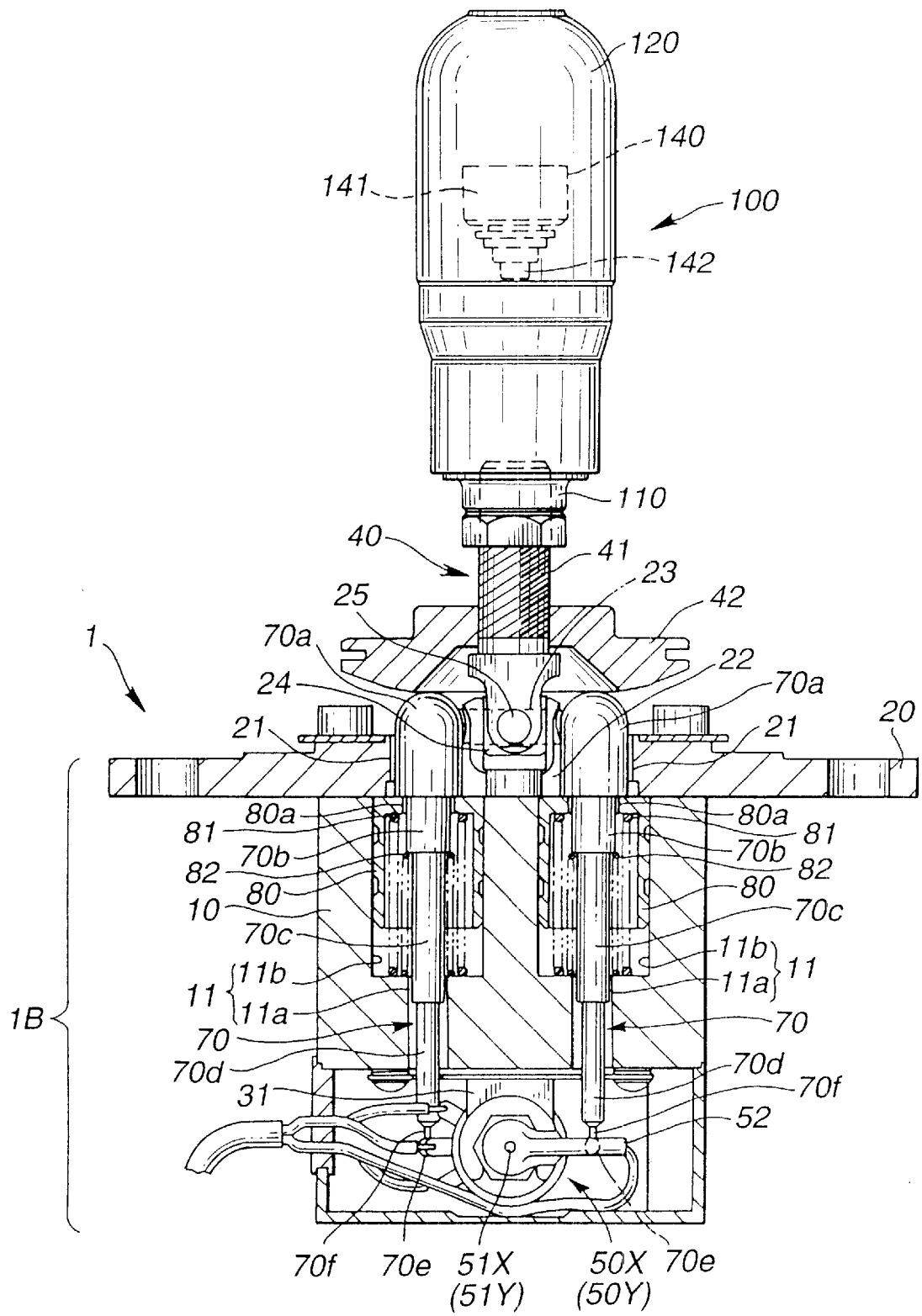
FIG. 2 is a sectional side view of the operation lever device shown in FIG. 1.
Figure 3A:
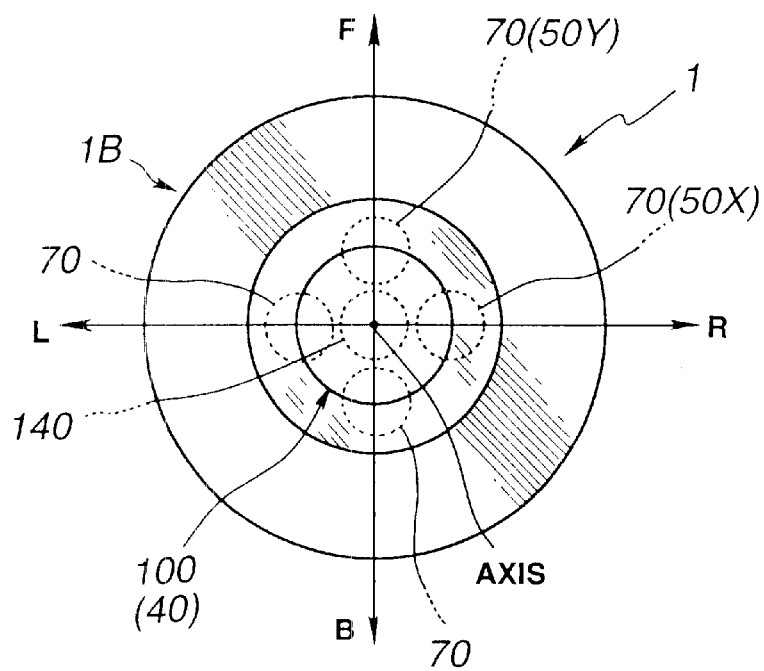
FIGS. 3(a) and 3(b) are a plan view and a side view conceptually showing the operation lever device.
Figure 3B:
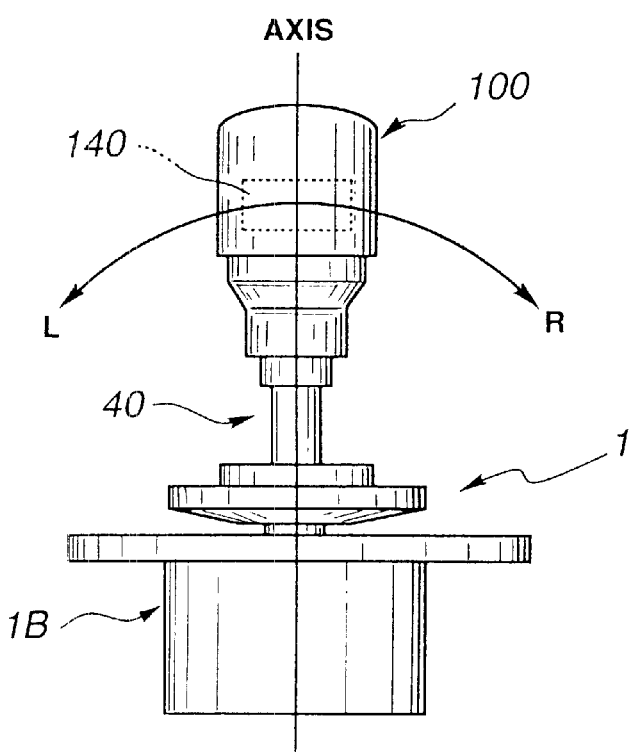

FIG. 2 is a sectional diagram of the operation lever device 1 configuring the control device for a vehicle device. FIGS. 3(a) and 3(b) are a concept plan view and side view showing the operation lever device 1 shown in FIG. 2.

As shown in FIG. 2, the operation lever device 1 has device body 1B which comprises body block 10 and mounting plate 20.

The mounting plate 20 has through holes 21. The through holes 21 have an inner diameter to let contact rod section 70a of operation rod 70 pass through.

The mounting plate 20 is attached to the top of the body block 10. Forked bracket 22 is disposed at the center of the top end of the mounting plate 20. Tilting piece member 24 is disposed on the forked bracket 22 through first support shaft 23. The operation lever 40 is disposed on the tilting piece member 24 through second support shaft 25.

The second support shaft 25 is parallel to the top surface of the mounting plate 20 and intersects at right angles with the drawing sheet. This second support shaft 25 supports the operation lever 40 to be rotatable about its axis to the tilting piece member 24. In other words, the operation lever 40 can be rotated about the axis of the second support shaft 25 so to tilt in left and right directions in FIG. 2, namely L-R directions in FIGS. 3(a) and 3(b).

The first support shaft 23 is parallel to the top surface of the mounting plate 20 and square to the second support shaft 25. This first support shaft 23 supports the tilting piece member 24 to be rotatable about its axis to the forked bracket 22. In other words, the operation lever 40 can be rotated about the axis of the first support shaft 23 together with the tilting piece member 24 so to tilt in a direction intersecting at right angles with the drawing sheet of FIG. 2, namely F-B directions of FIG. 3(a).

Therefore, the operation lever 40 can be tilted in two directions so to be square to the device body 1 to each other.

Disk plate 42 is mounted on operation shaft section 41 of the operation lever 40. Contact surface of the disc plate 42 to the respective operation rods 70 extends to intersect at right angles with the axis )f the operation shaft section 41.

As shown in FIGS. 3(a) and (b), the device body 1 has two pairs of operation rods 70 disposed around the forked bracket 22. One pair of operation rods 70 is arranged in L-R directions with the axis of the operation lever 40 between them. Other one pair of operation rods 70 is arranged in F-B directions with the axis of the operation lever 40 between them.

FIG. 2 shows one lair of operation rods 70 arranged in the L-R directions. The respective operation rods 70 have contact rod section 70a, first rod section 70b, second rod section 70c, third rod section 70d and linkage rod section 70f. The each operation rod 70 is designed to be thin gradually from the contact rod section 70a to the linkage rod section 70f. The each linkage rod section 70f of the operation rod 70 is provided with ball joint 70e at its leading end.

These operation rods 70 are disposed to be movable vertically through insertion holes 11, 21 of the device body 1 with the leading ends of the contact rod sections 70a in contact with the cum disk plate 42.

One of the pair of operation rods 70 arranged in the L-R directions is connected to drive arm 52 of potentiometer 50X through the ball joint 70e of its bottom end. The other operation rod 70 has nothing connected to the ball joint 70e.

The insertion hole 11 for the body block 10 has rod passing section 11a and spring accommodation section 11b.

The rod passing section 11a has an inner diameter for inserting the contact rod section 70a of the operation rod 70 and is open at the lower end of the body block 10.

The spring accommodation section 11b has a diameter larger than the insertion hole 21 of the mounting plate 20. The spring accommodation section 11b has therein piston cap 80, feeling spring 81 and following spring 82.

The piston cap 8 is cylindrical and has a top wall. The first rod section 70b of the operation rod 70 is passe through insertion hole 80a of the top wall.

This piston cap 80 has an overall length shorter than that of the spring accommodation section 11b. Therefore, the piston cap 80 can be moved vertically in the spring accommodation section 11b.

The feeling spring 81 is disposed around the outer periphery of the operation rod 70 and between the inner surface of the top wall of the piston cap 80 and the bottom surface of the spring accommodation section 11b. The feeling spring 81 keeps pushing the top wall of the piston cap 80 to the lower surface of the mounting plate 20.

The following spring 82 is disposed around the inner periphery of the feeling spring 81 and between a base surface of the first rod section 70b of the operation rod 70 and the bottom surface of the spring accommodation section 11b. The following spring 82 keeps pushing the operation rod 70 upward through the first rod section 70b.

The potentiometer 50X for detecting inclination of the operation lever 40 in the L-R directions and potentiometer 50Y for detecting inclination of the operation lever 40 in the F-B directions are disposed at the center of the bottom end of the lower surface of the body block 10. FIG. 2 shows the potentiometer 50X only.

The potentiometer 50X, 50Y are fixed to bracket 3 1so that rotation axes 51X, 51Y become parallel to the second support shaft 25 of the operation lever 40. The potentiometers 50X, 50Y have drive arm 52 which pivots on the rotation axes 51X, 51Y respectively.

The potentiometer 50X, 50Y output a control signal corresponding to a pivoting position of the drive arm 52.

Operations of the operation lever 40 which is tilted to right or left on the axis of the second support shaft 25, namely in the L-R directions, will be described with reference to FIG. 2.

When an external force is not applied to the operation lever 40, the top wall of piston cap 80 is in contact with the lower surface of the mounting plate 20. At this time, only a pushing force of the following spring 82 acts on the operation rods 70.

Therefore, the respective contact rod sections 70a of the operation rods 70 are pushed against the disk plate 42 of the operation lever 40. As a result, the operation lever 40 has the axis of the operation shaft section 41 held in a tilting neutral position along the perpendicular direction by a balanced pushing force of the following spring 82.

When the operation lever 40 is gradually tilted, for example, from the aforesaid tilting neutral position to right, the right operation rod 70 is gradually lowered according to the tilted amount of the operation lever 40 through the disk plate 42.

When the operation rod 70 is lowered, the potentiometer 50X is turned clockwise through the drive arm 52 according to the lowered level of the operation rod 70. When the drive arm 52 turns clockwise, a control signal is output from the potentiometer 50 according to the tilted amount of the operation lever 40.

Meanwhile, the left operation rod 70 is moved upward according to the tilted amount of the operation lever 40 owing to the pushing force of the following spring 82. In other words, the left operation rod 70 has the contact rod section 70a kept in contact with the disk plate 42 of the operation lever 40.

When the operation lever 40 is gradually tilted from the tilting neutral position to left, the left operation rod 70 is gradually lowered through the disk plate 42 according to the tilted amount of the operation lever 40.

At this time, the right operation rod 70 is moved upward by the pushing force of the following spring 82 according to the tilted amount of the operation lever 40. In other words, the right operation rod 70 has the contact rod section 70a kept in contact with the disk plate 42 of the operation lever 40.

Therefore, the potentiometer 50X is turned counterclockwise through the drive arm 52 according to the upwardly moved level of the right operation rod 70. When the drive arm 52 is turned counterclockwise, a control signal corresponding to the tilted amount of the operation lever 40 is output from the potentiometer 50X.

When the operation lever 40 is tiled about the axis of the first support shaft 23, namely forward or backward along the F-B directions, a control signal corresponding to the tilted amount of the operation ever 40 is output from the potentiometer 50Y in the same way as the operation to tilt right and left in the L-R directions.

Figure 4:
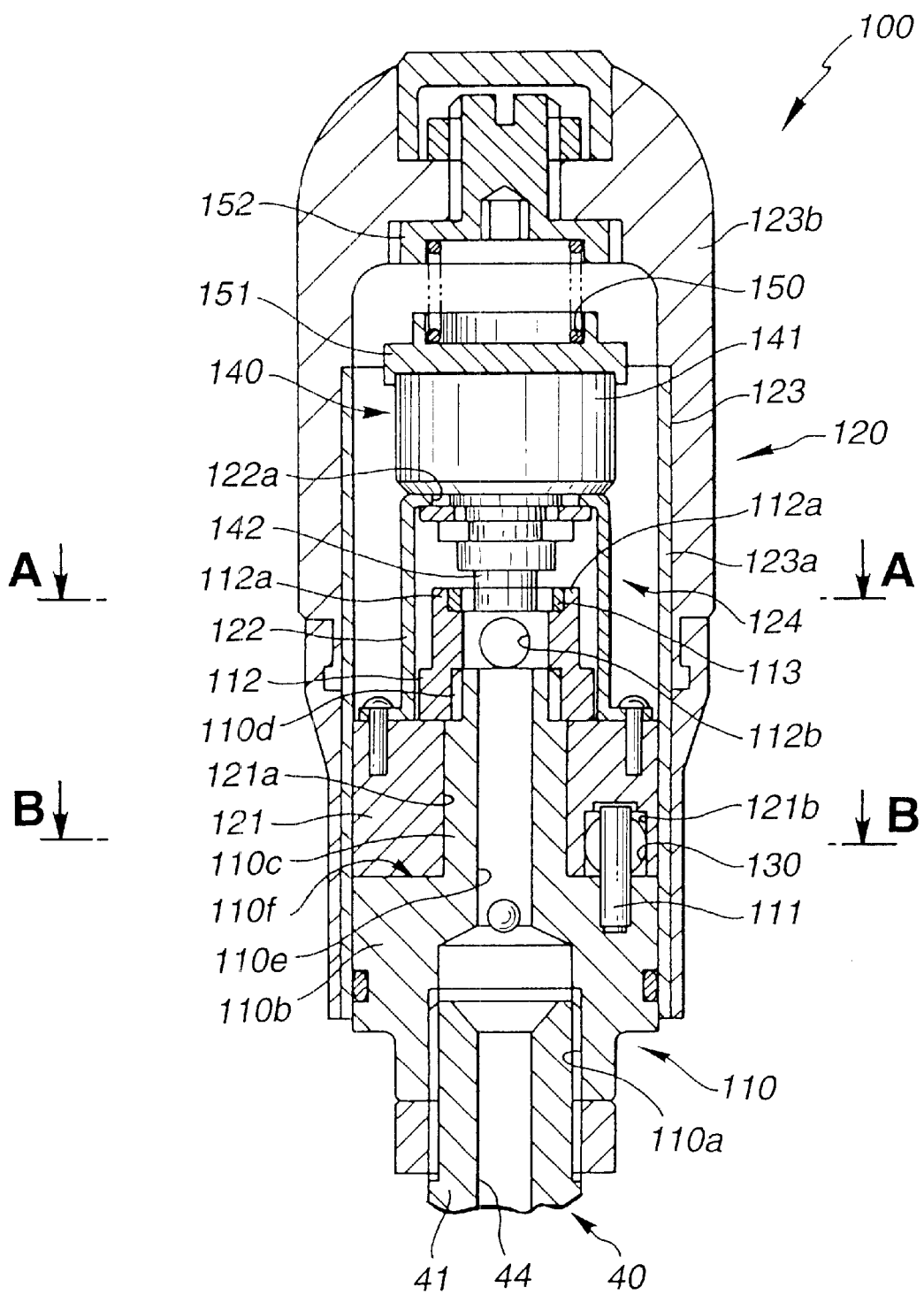
FIG. 4 is a sectional side view showing the operation lever device of the driving control device for a vehicle device to which the present invention pertains.

FIG. 4 shows the periphery of the operation lever 40 of the operation lever device 1. The operation lever 40 of the operation lever device 1 has operation knob 100 at its leading end.

The operation knob 100 is a unit having mounting member 110 and holding operation member 120. The mounting member 110 has screw hole 110a. The holding operation member 120 is mounted oh the mounting member 110 so to be rotatable about the axis of the screw hole 110a.

This operation knob 400 is removably mounted on the operation shaft section 41 of the operation lever 40 through screw hole 110a of the mounting member 110. The mounting member 110 integrally comprises base section 110b and sliding shaft section 110c.

The holding operation member 120 has base body 121 on the outer periphery of the sliding shaft section 110c of the mounting member 110.

The base body 121 has the same outer diameter as the base section 110b of the mounting member 110. lhe base body 121 has sliding hole (through hole) 121a, in which the sliding shaft section 110c is rotatably inserted, on its axis.

The base section 110b of the mounting member 110 has the screw hole 110a on base end face 110g. The base section 110b has an outer diameter larger than that of the operation shaft section 41 of the operation lever 40. The base section 110b has engaging pin 111 on its end face 110f. The end surface 111f of the base section 110b is contacted with the base body 121.

The sliding shaft section 110c has Screw ditch 110d has a screw thread on the outer periphery surface of its top section. And, it also has along its axis communication hole 110e to communicate with the screw hole 110a.

The base body 121 accommodates the engaging pin 111 within spring accommodation groove 121b and also has the sliding shaft section 110c inserted into the sliding hole 121a. The base body 121 is rotatable with respect to the mounting member 110.

The base body 121 has joint nut 112 connected to the screw thread 110d. Therefore, the base body 121 does not move in the axial direction to the mounting member 110.

The base body 121 has hat bracket 122 on its top. The hat bracket 122 is higher than the joint nut 112. The hat bracket 122 has mounting hole 122a on its top.

Figure 5:
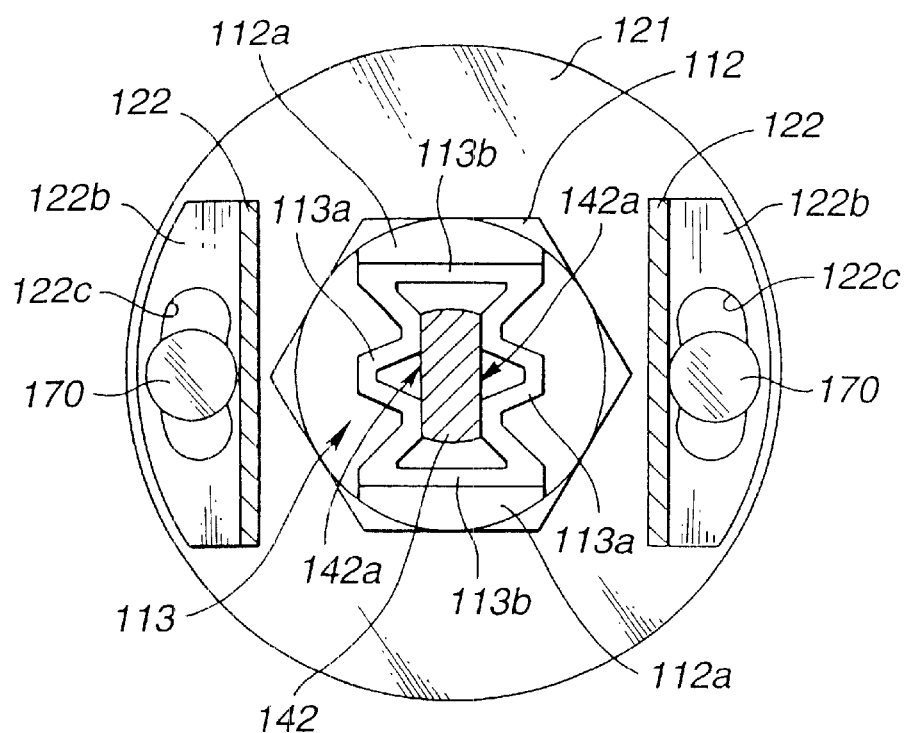
FIG. 5 is a sectional view taken along line A—A of FIG. 4.

FIG. 5 shows a cross section taken along line A—A of FIG. 4.

As shown in FIG. the hat bracket 122 has arc-shaped mounting hole 122c formed on a pair of flanges 122b.

This hat bracket 122 is fixed to the base body 121 by mounting screws 170. The axis of the mounting hole 122a of the hat bracket 122 agrees with that of the sliding shaft section 110c of the mounting member 110.

Figure 6:
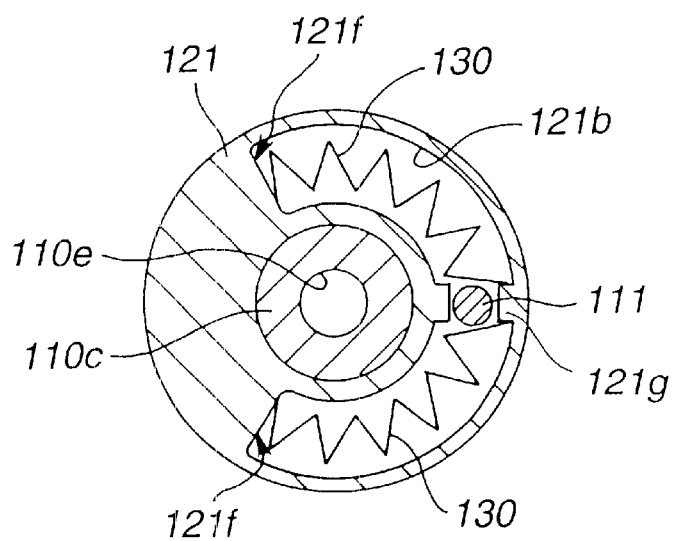
FIG. 6 is a sectional view taken along line B—B of FIG. 4.

FIG. 6 is a sectional view taken along line B—B of FIG. 4.

As shown in FIG. 6 the base body 121 has the arch-shaped spring accommodation groove 121b at the position corresponding to the engaging pin 111. Neutral return springs 130, 130 are disposed between both end faces 121f and projection 121g of the spring accommodation groove 121b.

The neutral return springs 130 are coil-shaped and have the same spring constant mutually. The neutral return springs 130 push the base body 121 in opposite rotation directions through end face 121b of the respective spring accommodation grooves 121b.

In other words, the neutral return springs 130 serve to return the rotated base body 121 to the neutral position.

These neutral return springs 130 are configured to have the same peripheral length from the engaging pin 111 to the respective end faces 121b of the spring accommodation groove 121b. The neutral position of the base body 121 is a point where the spring forces of these neutral return springs 130 are well-balanced.

As shown in FIG. 41 the holding operation member 120 has outer sheath 123. The outer sheath 123 has cylindrical section 123a and shell section 123b.

The cylindrical section 123a is cylindrical and has an inner diameter corresponding to the outer diameter of the base body 121. The cylindrical section 123a has a length longer than the base body 121.

The shell section 123b is made of a resin and covers the outer peripheral surface of the cylinder section 123a. The shell section 123b is adhered to the outer peripheral surface of the cylinder section 123 a so to seal the top of the cylinder section 123a.

This outer sheath 123 has the mounting member 110 and the base section 121 at the base of the cylinder section 123a. Further, the outer sheath 123 is disposed to be rotatable with respect to the mounting member 110 and movable along the axis (see FIGS. 3(*a*) and 3(*b*)).

The outer sheath 123 forms cylindrical accommodation chamber 124 at the upper space of the base body 121. This accommodation chamber 124 has therein third potentiometer 140 and pushing springs 150.

The third potentiometer 140 has rotation shaft 142 on one end face of body casing 141. The third potentiometer 140 outputs a control signal corresponding to the rotated position of the rotation shaft 142.

In other words, the third potentiometer 140 detects the rotated amount of the operation knob 100 about the axis of the operation lever 40 (FIGS. 3(*a*) and 3(*b*)).

This third potentiometer 140 has the bottom end of the rotation shaft 142 faced the joint nut 112 through the mounting hole 122*a* of the hat bracket 122. And, the third potentiometer 140 is held by the hat bracket 122 through the body casing 141, and the axis of the rotation shaft 142 agrees with that of the sliding shaft section 110*c*.

Figure 7:
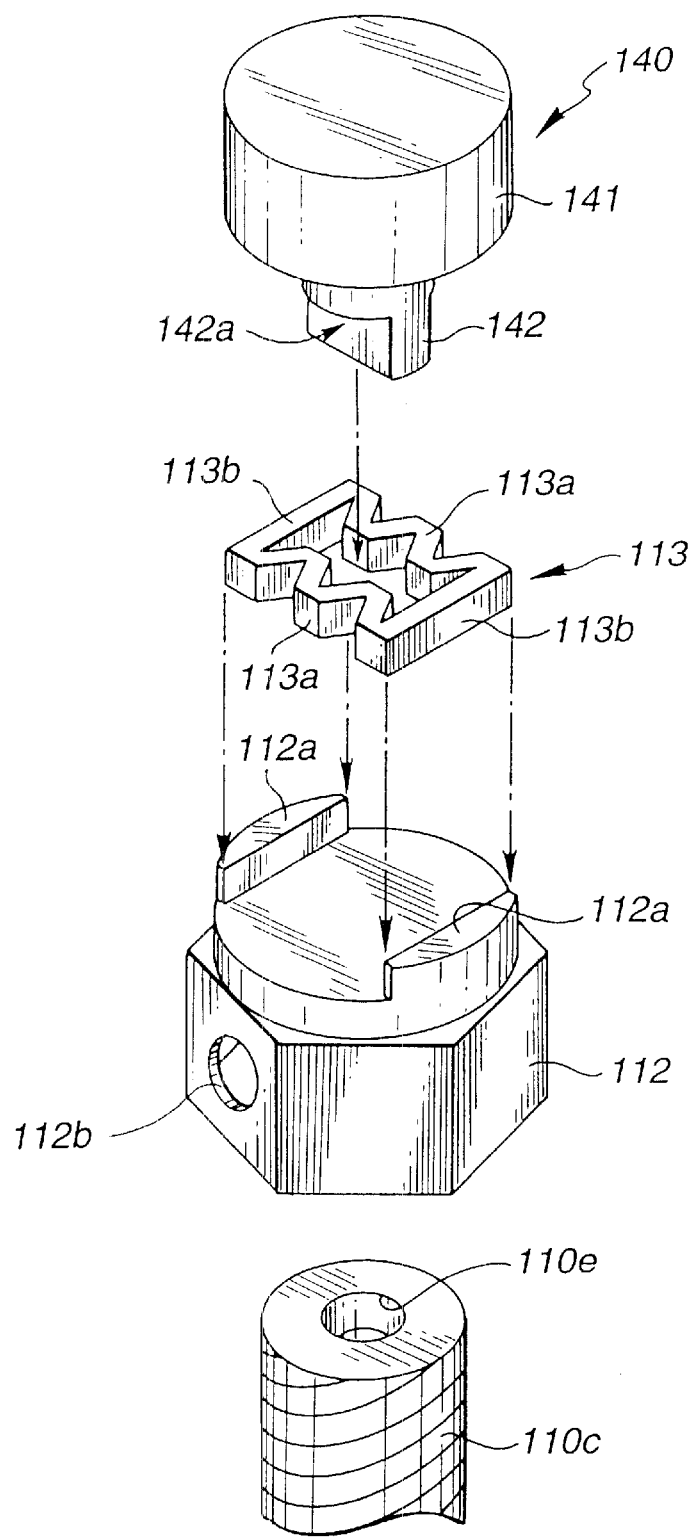
FIG. 7 is an exploded perspective view showing an embodiment to mount a third potentiometer (spin turn instruction means) in the operation lever device shown in FIG. 2.

FIG. 7 shows an embodiment of connecting the rotation shaft 142 of the third potentiometer 140 with the sliding shaft of the mounting member 110 in the operation lever device shown in FIG. 2.

The rotation shaft 142 of the third potentiometer 140 is formed a pair of fiat faces 142*a*. The joint nut 112 has a pair of opposed walls 112*a* at its end face. And, a retainer 113 is disposed between the flat faces 142*a* of the rotation shaft 142 and the opposed walls 112*a* of the joint nut 112.

The retainer 113 has a pair of holding sections 113*a* having a waveform and a pair of sliding contact section 113*b* for connecting both ends of the holding sections 113*a*. The retainer 113 is held between the opposed walls 112*a* of the joint nut 112 through the sliding contact section 113*b*. And the flat faces 142*a* of the rotation shaft 142 are held through the holding section 113*a*.

This retainer 113 connects the rotation shaft 142 of the third potentiometer 140 with the joint nut 112. The retainer 113 absorbs a displacement between a relative rotation axis of the base body 121 to the sliding shaft section 110*c* of the mounting member 110 and the axis of the rotation shaft 142 of the third potentiometer 140.

As shown in FIG. 4, the pushing spring 150 is disposed between stationary spring seat 151 disposed on the body casing 141 of the third potentiometer 140 and movable spring seat 152 disposed on the top wall within the shell section 123*b*. This pushing spring 150 keeps pushing the outer sheath 123 to the top end (the upper section in FIG. 4) of the third potentiometer 140.

It is not shown in FIG. 4 but the third potentiometer 140 has a lead passed through the communication hole 110*e* of the mounting member 110 through the insertion hole 112*b* formed on the joint nut 112 and drawn out through lead insertion hole 44 formed on the operation lever 40.

Figure 8:
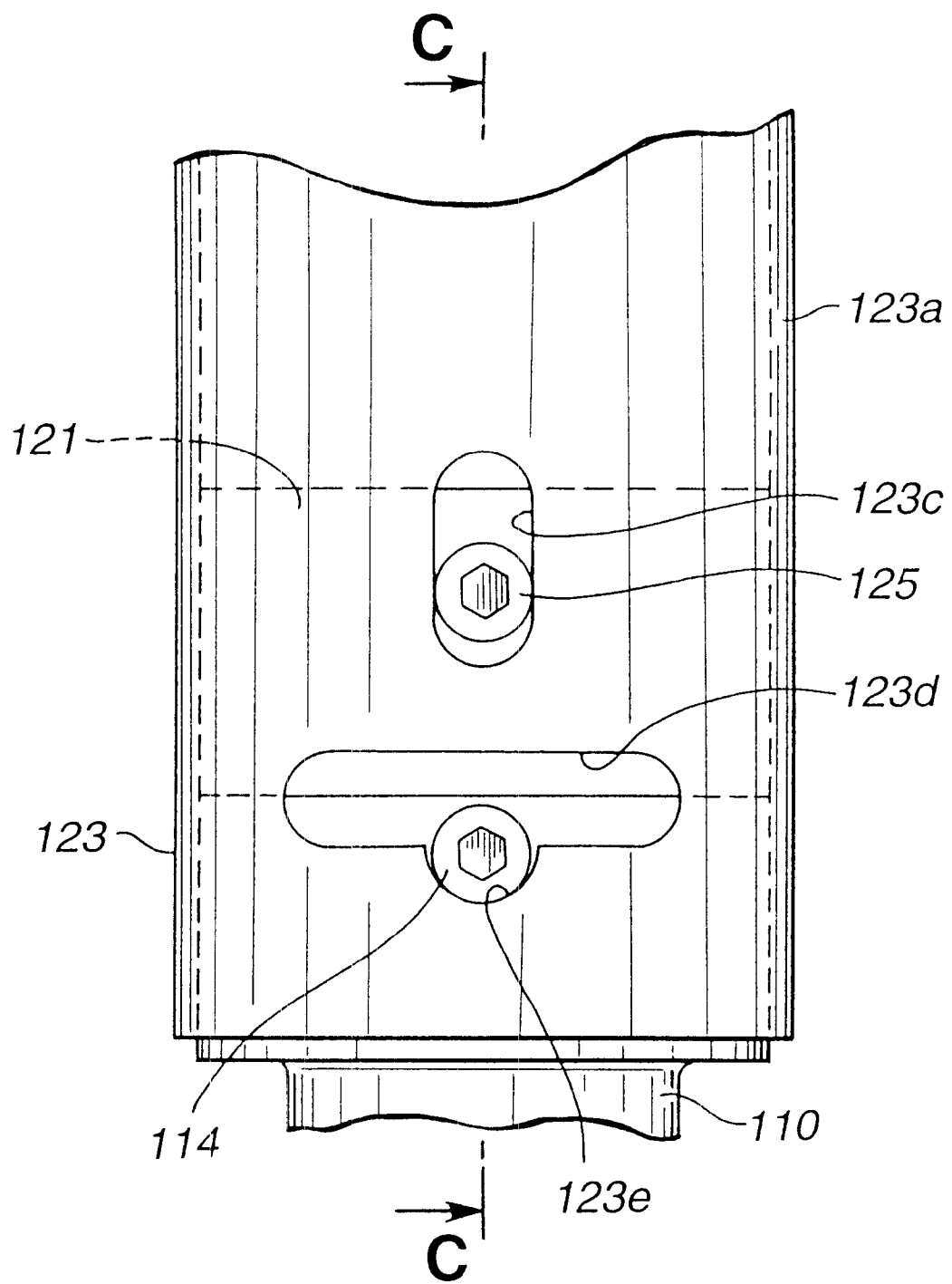
FIG. 8 is a side view showing a tilting angle restriction means of the operation lever device shown in FIG. 2.

FIG. 8 shows rotating angle restriction means of the operation lever device shown in FIG. 2.

The outer sheath 123 has vertical groove 123*c* and lateral groove (oblong hole for restriction) 123*d* on the cylindrical section 123*a*.

The vertical groove 123*c* is an oblong hole formed in the axial direction of the cylindrical section 123*a*. The head of rotation restriction bolt 125 is fitted into the vertical groove 123*c*.

The lateral groove 123*d* is an oblong hole formed in a direction to intersect at right angles with the axis of the cylindrical section 123*a*. The lateral groove 123*d* has a length corresponding to a maximum rotation angle allowed for the third potentiometer 140.

Semicircular concave 123*e* is formed at the center of the lateral groove 123*d*. The head of rotation angle restriction bolt (projection) 114 is fitted into the lateral groove 123*d*.

Figure 9:
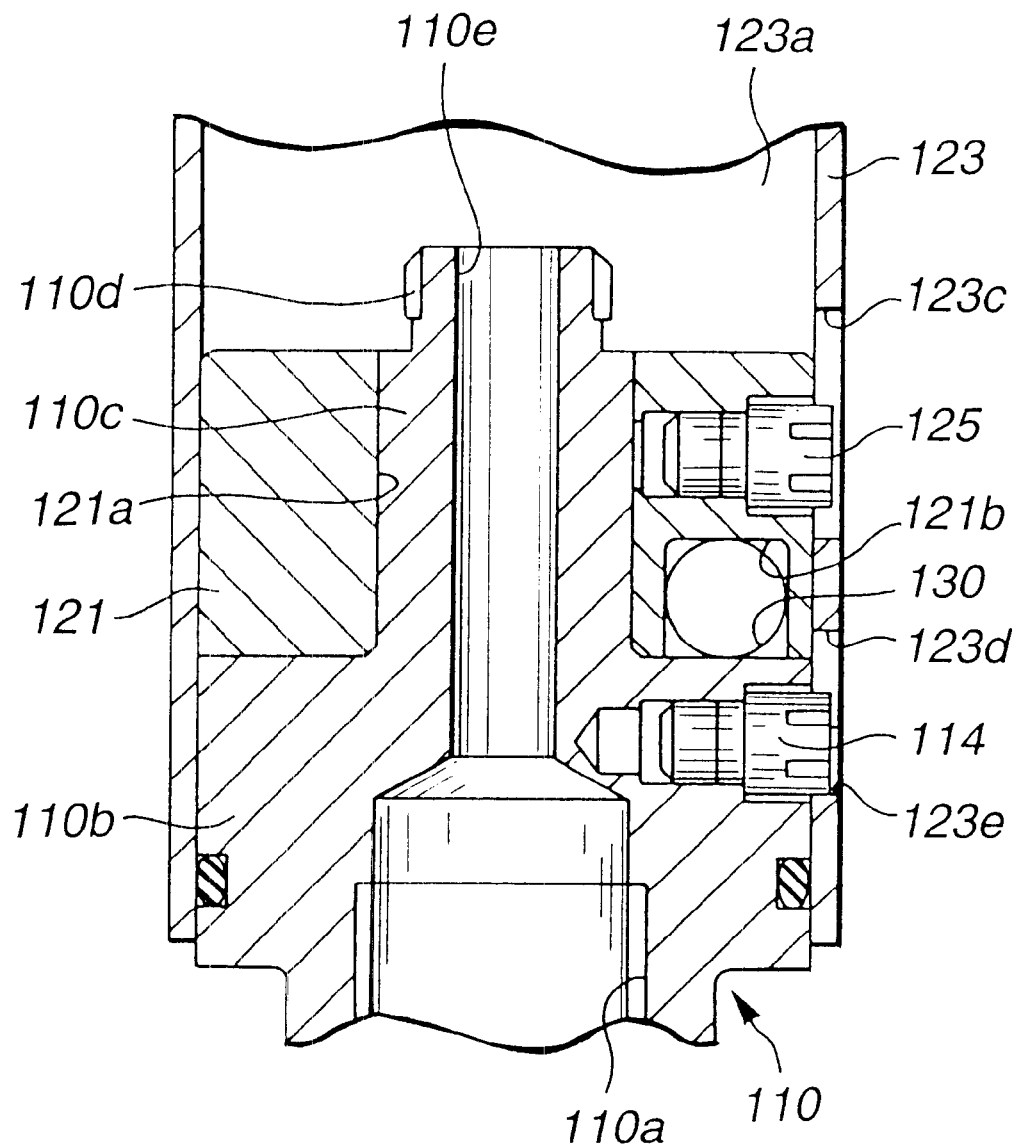
FIG. 9 is a sectional view taken along line C—C of FIG. 8.

FIG. 9 shows a sectional view taken along line C—C of FIG. 8.

The rotation restriction bolt 125 is installed to the outer peripheral surface of the base body 121 of the holding operation member 120. The rotation restriction bolt 125 comes in contact with the side wall of the vertical groove 123*c* to restrict the movement of the cylindrical section 123*a* to the base body 121. The rotation restriction bolt 125 allows the cylindrical section 123*a* to move in the axial direction to the base body 121 within a range of length of the vertical groove 123*c*.

The rotation angle restriction bolt 114 is fitted to the base section 110*b* of the mounting member 110. When the head of the rotation angle restriction bolt 114 is housed in the concave section 123*e* of the lateral groove 123*d*, the circular movement of the cylindrical section 123*a* to the base body 121 is restricted.

Referring to FIG. 4, the operation to rotate the operation knob 100 fitted to the operation lever 40 about the axis (see FIG. 10) will be described.

When the base body 121 of the holding operation member 120 and the mounting member 110 are in the rotation neutral position, the head of the rotation angle restriction bolt 114 is held in the concave section 123*e* of the lateral groove 123*d* by the pushing force of the pushing spring 150.

When they are in the rotation neutral position, the head of the rotation angle restriction bolt 114 is in contact with the inner wall of the concave section 123*e*, so that the holding operation member 120 is prevented from rotating to the mounting member 110. Therefore, when the operation lever 40 is tilted, the holding operation member 120 does not rotate to the mounting member 110.

When the operation knob 100 is pushed down against the pushing spring 150, the head of the rotation angle restriction bolt 114 is disengaged from the concave section 123*e* to move into the lateral groove 123*d*.

Thus, the outer sheath 123 of the holding operation member 120 can be rotated within the lateral groove 123*d* to the mounting member 110.

Thus, the outer sheath 123 can be rotated against the neutral return spring 130 by applying a rotation force to the outer sheath 123.

When the outer sheath 123 is rotated, its rotation force is transmitted to the base body 121 through the rotation restriction bolt 125. And, the rotation of the base body 121 is transmitted to the body casing 141 of the third potentiometer 140 through the hat bracket 122.

As a result, the body casing 141 of the third potentiometer 140 is rotated to the mounting member 110 by the rotation of the holding operation member 120.

Therefore, when the outer sheath 123 is rotated, a difference of rotation is caused between the body casing 141 of the third potentiometer 140 and the rotation shaft 142. As a result, a control signal corresponding to a relative rotation angle of the outer sheath 123 to the mounting member 110 is output from the third potentiometer 140.

When the external force being applied to the outer sheath 123 is eliminated, the holding operation member 120 is rotated in an opposite direction to the mounting member 110 owing to the action of the neutral return spring 130. Then, the holding operation member 120 stops in the rotation neutral position. By the pushing force of the pushing spring 150, the head of the rotation angle restriction bolt 114 is returned to a state held in the concave section 123e of the lateral groove 123d.

Figure 10:
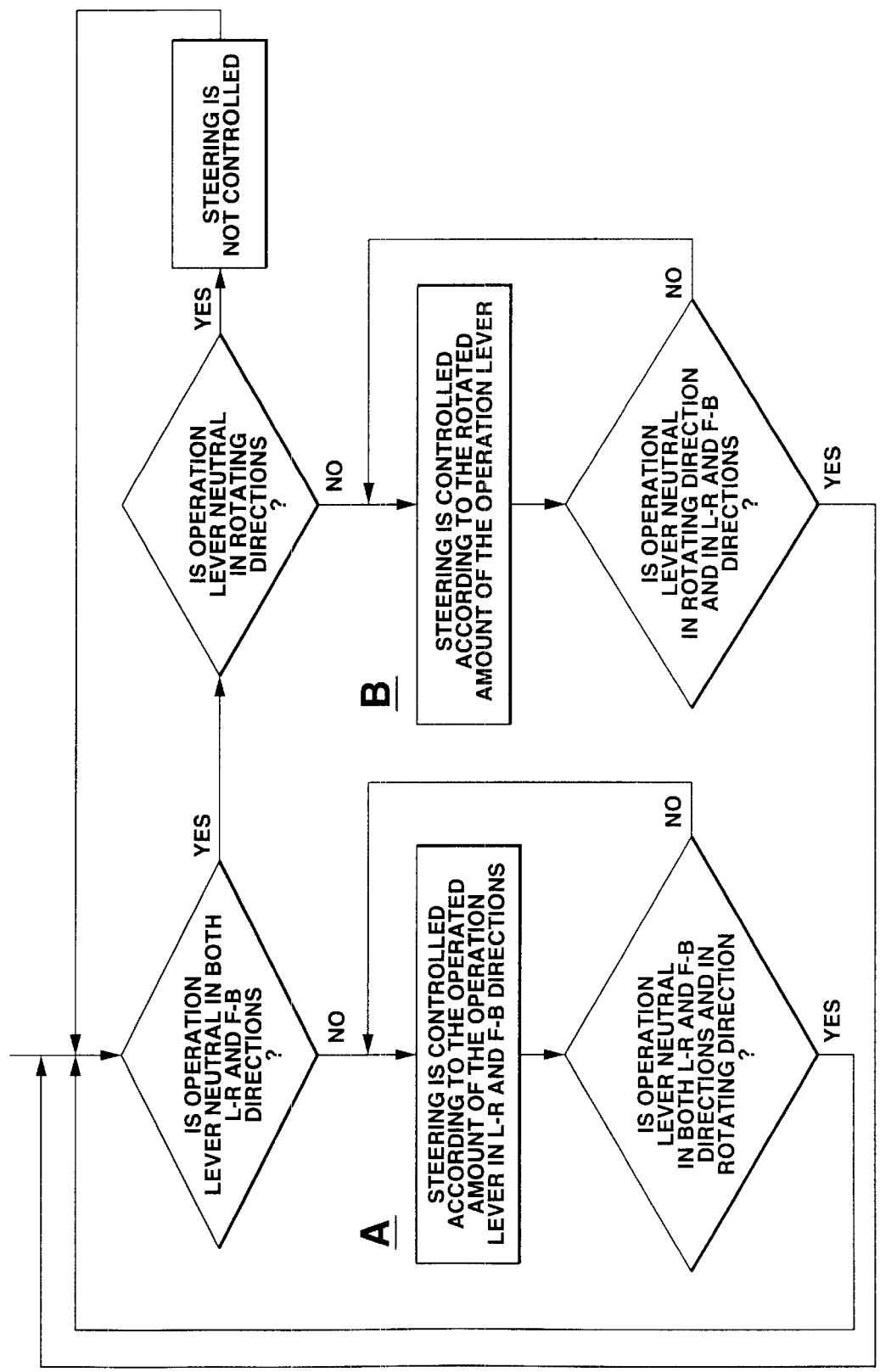
FIG. 10 is a flowchart showing control algorithm of the driving control device for a vehicle device to which the present invention pertains.

FIG. 10 shows control algorithm of the driving control device to which the present invention pertains. When the operation lever 40 is neutral in both the L-R and F-B directions and about the axis, the steering of the vehicle device is under no control.

When the operation lever 40 is not neutral in the L-R directions or the Y direction, namely when it is tilted in any direction, the vehicle device is steered according to the operated amount of the operation lever 40 in the L-R directions and the F-B directions (control A in the control algorithm of FIG. 10).

Under the control A of the control algorithm, a signal output from the third potentiometer 140 as the spin turn instruction means is completely disregarded. Namely, it does not take part in the steering of the vehicle device.

Figure 11A:
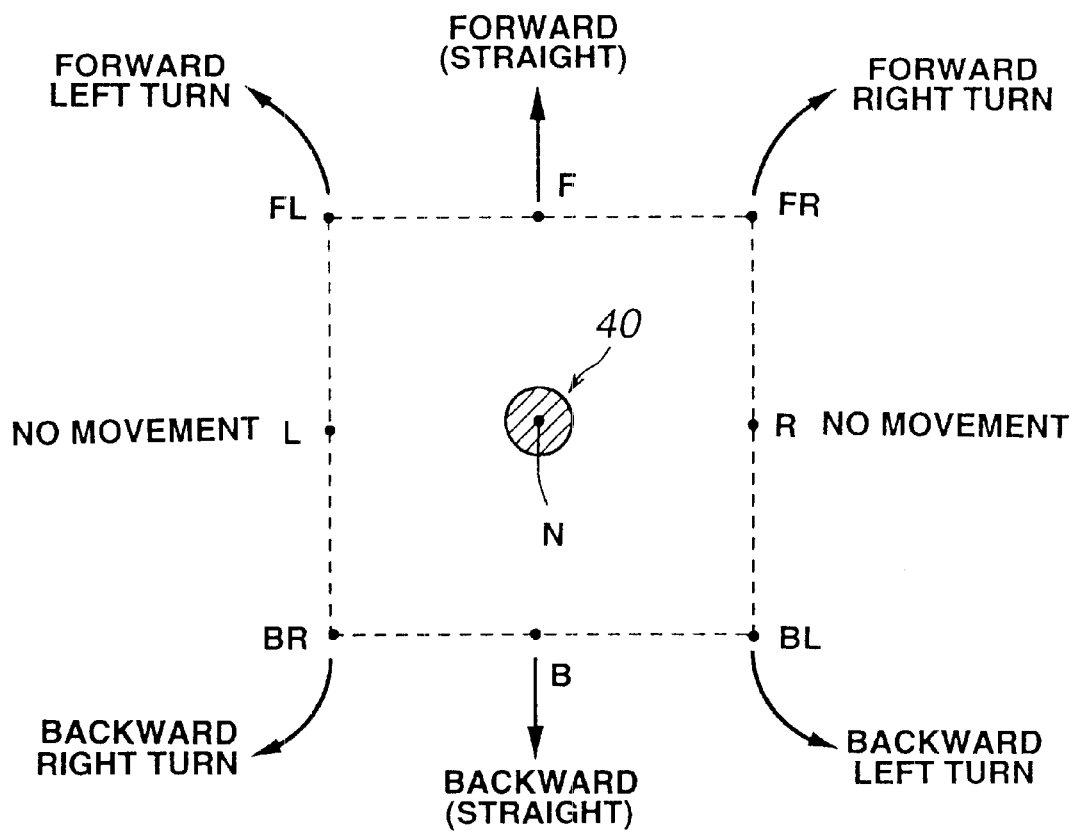
FIGS. 11(a) and 11(b) are diagrams illustrating movements of a vehicle in correspondence with the operation of the operation lever.
Figure 11B:
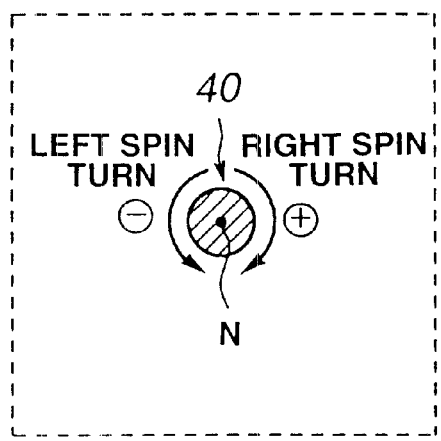

FIGS. 11(a) and 11(b) show movements of the vehicle device in correspondence with movements of the operation lever 40. As shown in FIG. 11(a), when the operation lever 40 which is in the neutral position (N) is tilted forward (upward in the drawing), a control signal corresponding to the tilted amount of the operation lever 40 is output from potentiometer 50Y of the operation lever device 1. Thus, the left traveling hydraulic motor 3L and the right traveling hydraulic motor 3R are controlled by the hydraulic motor control means 6, and the bulldozer (vehicle device) moves forward (straight) as indicated by arrow F in FIG. 11. The vehicle device travels at a speed corresponding to the tilted amount of the operation lever 40.

When the operation lever 40 which is in the neutral position (N) is tilted backward (downward in the drawing), a control signal corresponding to the tilted amount of the operation lever 40 is output from the potentiometer 50Y of the operation lever device 1. Thus, the left traveling hydraulic motor 3L and the right traveling hydraulic motor 3R are controlled by the hydraulic motor control means 6, and the bulldozer (vehicle device) goes backward (straight) as indicated by arrow B in FIG. 11. The vehicle device travels at a speed corresponding to the tilted amount of the operation lever 40.

When the operation lever 40 which is in the neutral position (N) is pivoted to right R or left L, the hydraulic motor control device 6 controls according to a signal output from only the potentiometer 50X of the operation lever device 1 to keep the bulldozer (vehicle device) stop.

When the operation lever 40 which is in the neutral position (N) is tilted forward to right (upper right direction in the drawing), control signals corresponding to the tilted amounts of the operation lever 40 are output from the potentiometers 50X, 50Y of the operation lever device 1. Thus, the left traveling hydraulic motor 3L and the right traveling hydraulic motor 3R are controlled by the hydraulic motor control means 6, and the bulldozer (vehicle device) makes a forward right turn as indicated by arrow FR in FIG. 11. The vehicle device moves at a speed corresponding to the tilted amount of the operation lever 40.

Similarly, when the operation lever 40 is tilted forward to left (upper left direction in the drawing), the bulldozer (vehicle device) makes a forward left turn as indicated by arrow FL in FIG. 11.

When the operation lever 40 is tilted backward to right (lower right direction in the drawing), the bulldozer (vehicle device) makes a backward left turn as indicated by arrow BL in FIG. 11.

And, when the operation lever 40 is tilted backward to left (lower left direction in the drawing), the bulldozer (vehicle device) makes a backward right turn as indicated by arrow BR in FIG. 11.

At the aforesaid forward left turn, backward left turn and backward right turn, the vehicle device travels at a speed corresponding to the tilted amount of the operation lever 40.

The operation lever 40 of the operation lever device 1 is provided with a dead band in a predetermined tilting range from the neutral position. Thus, good operability can be obtained without requiring to operate the operation lever 40 delicately.

As shown by the control algorithm of FIG. 10, when the operation lever 40 is neutral in the L-R and F-B directions but not neutral about the axis, namely when the operation lever 40 is in the neutral position in the L-R directions and the F-B directions, the operation lever 40 (operation knob 100) is turned in a given direction, and the vehicle device makes a spin turn according to the operated amount (twisted angle) of the operation lever 40 about the axis (control B with the control algorithm of FIG. 10).

Under the control B with the control algorithm, the signals output from the potentiometers 50X 50Y of the operation lever device 1 are completely disregarded. In other words, they do not take part in the steering (spin turn) of the vehicle device.

As shown in FIG. 11(b), the operation lever 40 which is in the neutral position (N) is rotated to right about the axis a control signal corresponding to the twisted angle of the operation lever 40 is output from the third potentiometer (spin turn instruction means) 140 of the operation lever device 1. Thus, the left traveling hydraulic motor 3L and the right traveling hydraulic motor 3R are controlled by the hydraulic control means 6 to have the same rotations but in different rotation directions, and the bulldozer (vehicle device) makes a right spin turn.

When the operation lever 40 which is in the neutral position (N) is rotated left about the axis, a control signal corresponding to the twisted angle of the operation lever 40 is output from the third potentiometer (spin turn instruction means) 140 of the operation lever device 1. Thus, the left traveling hydraulic motor 3L and the right traveling hydraulic motor 3R are controlled by the hydraulic motor control means 6 to have the same rotations but in different rotation directions, and the bulldozer (vehicle device) makes a left spin turn.

Here, the signal (which makes the hydraulic motors 3L, 3R to have the same rotations but in different rotation directions) output from the third potentiometer (spin turn instruction means) 140 functions only when the operation lever 40 of the operation lever device 1 is in the neutral position in the L-R directions and the F-B directions.

Figure 12:
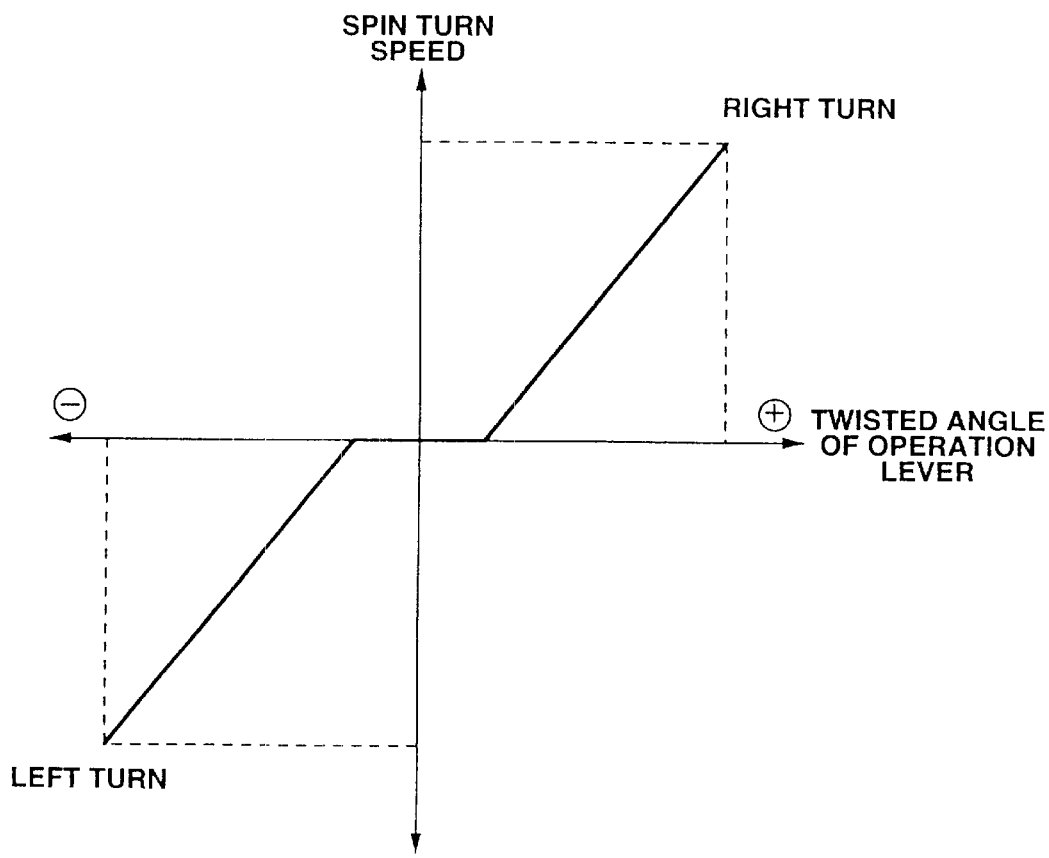
FIG. 12 is a chart showing a relation between a twisting angle of the operation lever and a spin turn speed.

FIG. 12 shows a relation between the twisted angle of the operation lever 40 and the spin turn speed. It is determined that the spin turn speed of the vehicle device increases in proportion to the twisted angle of the operation lever 40.

As shown in FIG. 12, the third potentiometer (spin turn instruction means) 140 of the operation lever 40 is provided with a dead band in a predetermined rotation range from the neutral position in the rotation direction of the operation lever 40.

Therefore, when the spin turn is instructed by the operation lever device 1, the operation lever 40 is operated with play, so that good operability can be obtained without requiring a delicate operation of the operation lever 40.

The control A (to control steering according to the operated amount of the operation lever in the L-R directions and the F-B directions) and the control B (to control steering according to the operated amount of the operation lever in the Z direction) in the control algorithm of FIG. 10 can be switched according to whether the operation lever 40 is tilted or rotated from its neutral position in the L-R directions (left and right directions), the F-B directions (forward and backward directions) and about the axis.

The aforesaid driving control device can make the spin turn of the vehicle device by rotating the operation lever 40 (operation knob 100) to follow the bull-pattern of the operation lever device 1.

The aforesaid driving control device can make the spin turn of the vehicle device by rotating the operation lever 40 (operation knob 100) only when it is in the neutral position. Thus, the operator can obtain good operability because the operator's operating feeling agrees with the vehicle behavior.

Figure 13:
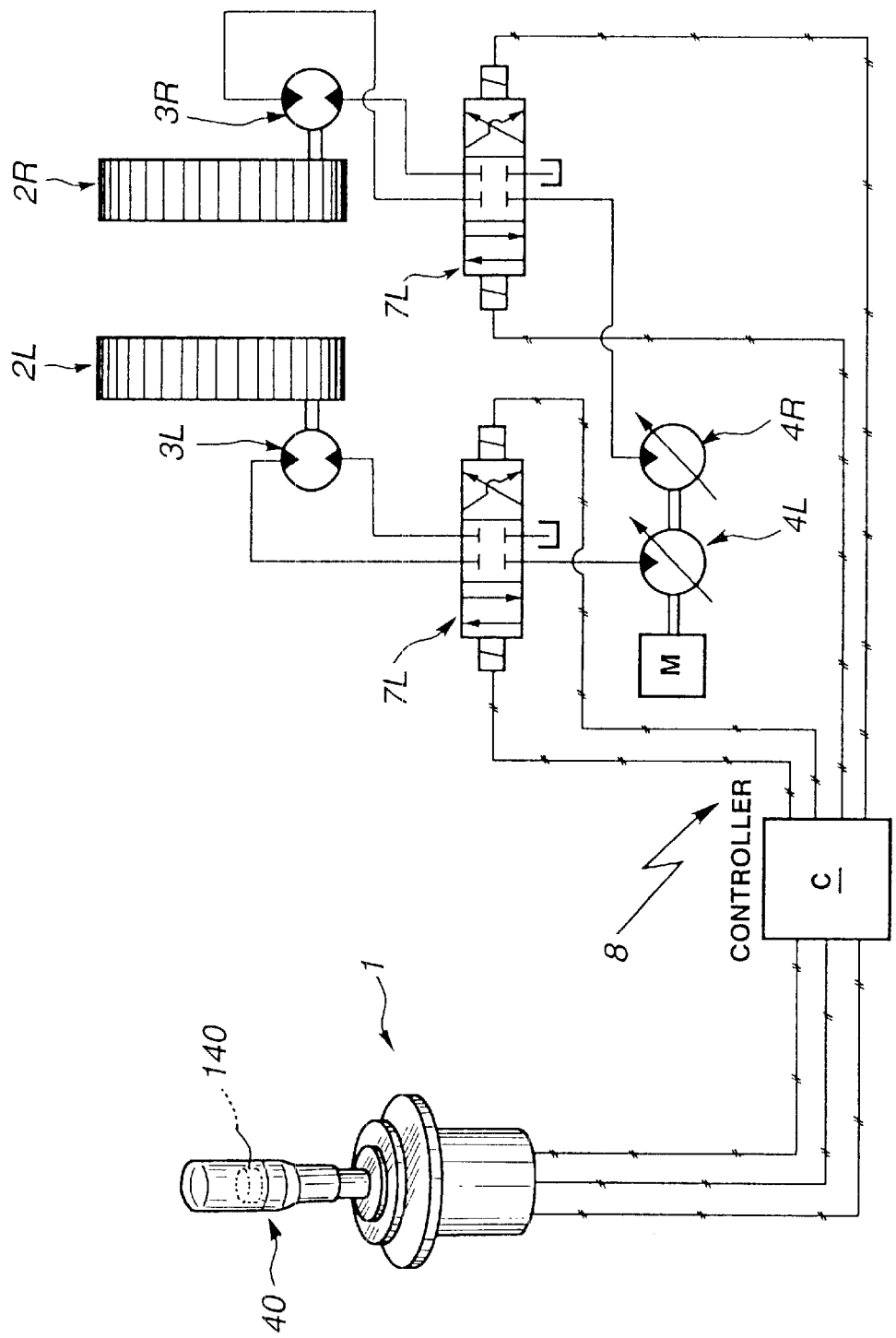
FIG. 13 is a concept diagram showing the driving control device for a vehicle device to which the present invention pertains.

FIG. 13 shows another embodiment of the driving control device for a vehicle device to which the present invention pertains. This driving control device is provided with control valve 7L on the hydraulic circuit which connects the left traveling hydraulic motor 3L with the variable displacement left traveling hydraulic pump 4L. And, control valve 7R is disposed on the hydraulic circuit which connects the right traveling hydraulic motor 3R with the variable displacement right traveling hydraulic pump 4R.

Hydraulic motor control means 8 of the driving control device shown in FIG. 13 has the control valves 7L, 7R and controller C for controlling to operate the controller valves 7L, 7R.

The controller C converts an electric signal of the L-R directions, F-B directions or about the axis output according to the operation of the operation lever 40 to control the operations of the control valves 7L, 7R so to run the vehicle according to the operation of the operation lever 40.

When the operation lever 40 of the operation lever device 1 is operated, the rotation speeds and rotation directions of the left traveling hydraulic motor 3L and the right traveling hydraulic motor 3R are controlled by the hydraulic motor control means 8, and the traveling of the bulldozer (vehicle device) is controlled.

The oil hydraulic circuit of the driving control device described above comprises a so-called open system which determines the rotation speed and rotation direction of the crawlers by the control valve disposed between the traveling hydraulic pump and the traveling hydraulic motor.

The driving control device shown in FIG. 13 is basically the same as the driving control device shown in FIG. 1 except that its oil hydraulic circuit comprises the open system. In other words, the steering style of the vehicle device according to the operation of the operation lever device 1 is also the same and provides the same function and effect as the driving control device shown in FIG. 1.

Figure 14:
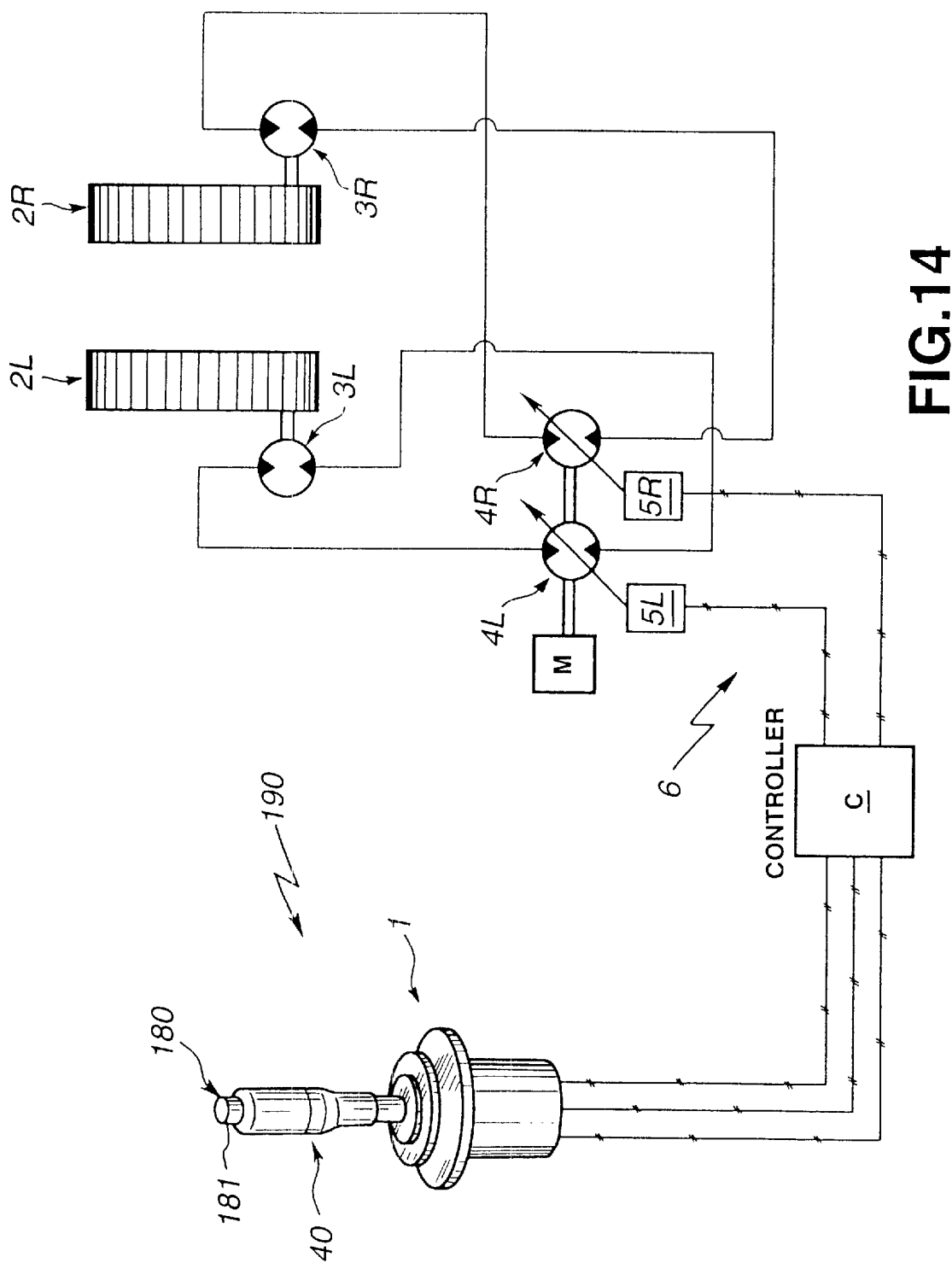
FIG. 14 is a concept diagram showing the driving control device for a vehicle device to which the present invention pertains.

FIG. 14 shows another embodiment of the driving control device for a vehicle device to which the present invention pertains. The operation lever device 1 of the driving control device is provided with changeover switch 180, which instructs whether or not the spin turn is made, instead of the third potentiometer 140 of the operation lever device 1 of the driving control device of FIG. 1.

The driving control device shown in FIG. 14 has the changeover switch 180 and the potentiometer 50X of the operation lever 1 to configure spin turn instruction means 190.

The driving control device shown in FIG. 14 is basically the same as the driving control device shown in FIG. 1 excepting the structure of the operation lever device 1. Therefore, detailed descriptions of the structures other than the operation lever device 1 will be omitted.

When the operation lever 40 is tilted in a given direction with operation button 181 of the changeover switch 180 of the operation lever device 1 not operated, namely with the spin turn not intended, the vehicle device is steered according to the operation amount of the operation lever 40 in the L-R directions and the F-B directions.

Figure 15A:
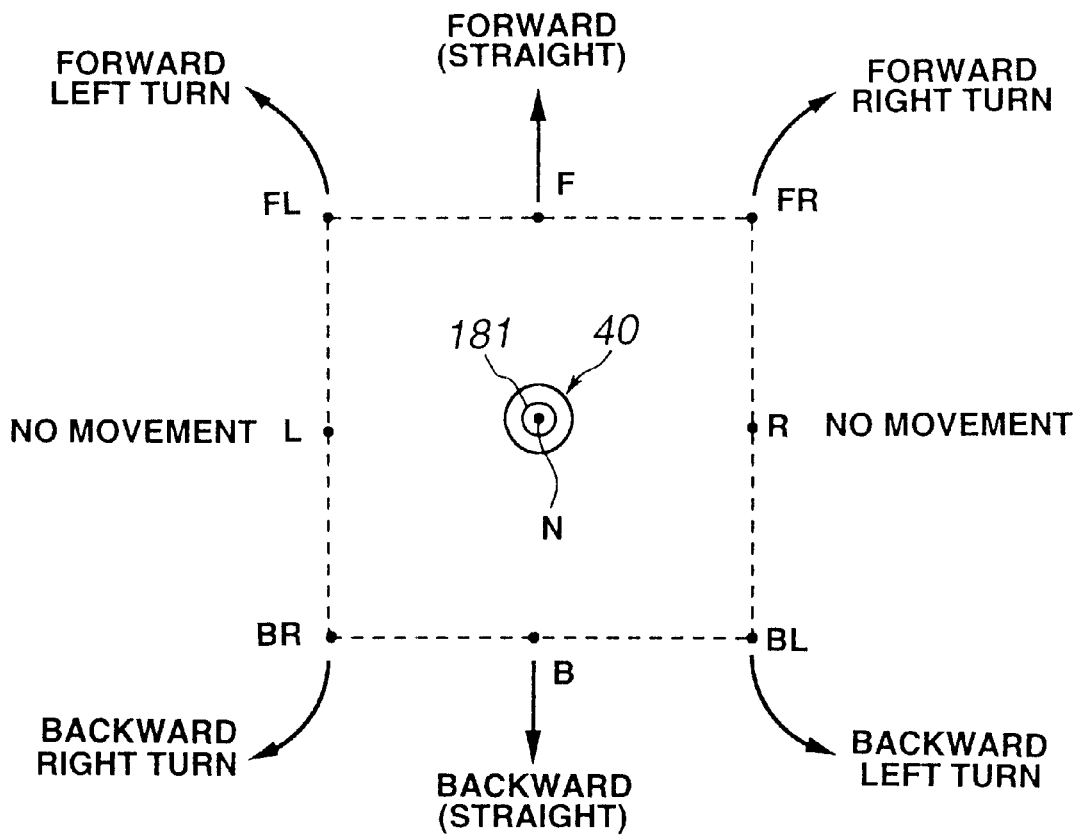
FIGS. 15(a) and 15(b) are diagrams illustrating movements of a vehicle in correspondence with the operation of the operation lever.

FIGS. 15(a) and (b) show movements of the vehicle device in correspondence with the movements of the operation lever 40. When the operation lever 40 which is in the neutral position is tilted forward (upward in the drawing) as shown in FIG. 15(a), the bulldozer (vehicle device) moves forward (straight) as indicated by arrow F in FIG. 5 in the same way as the driving control device shown in FIG. 1. And, when the operation lever 40 which is in the neutral position (N) is tilted backward (downward in the drawing), the bulldozer (vehicle device) moves backward (straight) as indicated by arrow B in FIG. 15.

When the operation lever 40 which is in the neutral position (N) is pivoted to right R or left L, the bulldozer (vehicle device) stops.

When the operation lever 40 which is in the neutral position (N) is tilted forward to right (upper right direction in the drawing), the bulldozer (vehicle device) makes a forward right turn as indicated by arrow FR in FIG. 15. And, when the operation lever 40 is tilted forward to left (upper left direction in the drawing), the bulldozer (vehicle device) makes a forward left turn as indicated by arrow FL in FIG. 15.

When the operation lever 40 is tilted backward to right (lower right direction in the drawing), the bulldozer (vehicle device) makes a backward left turn as indicated by arrow BL in FIG. 15. And, when the operation lever 40 is tilted backward to left (lower left direction in the drawing), the bulldozer (vehicle device) makes a backward right turn as indicated by arrow BR in FIG. 15.

When the vehicle device makes a forward movement, a backward movement, a forward right turn, a forward left turn, a backward left turn and a backward right turn, its traveling speed corresponds to the tilted amount of the operation lever 40.

When the operation lever 40 is tilted to left and right with the operation button 181 of the changeover switch 180 of the operation lever device 1 operated, namely the spin turn intended, the vehicle device makes the spin turn according to the tilted amount of the operation lever 40.

Figure 15B:
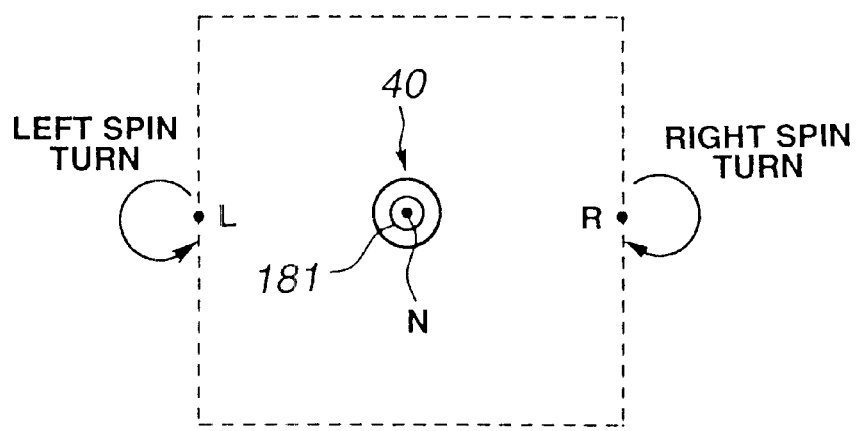
Figure 16:
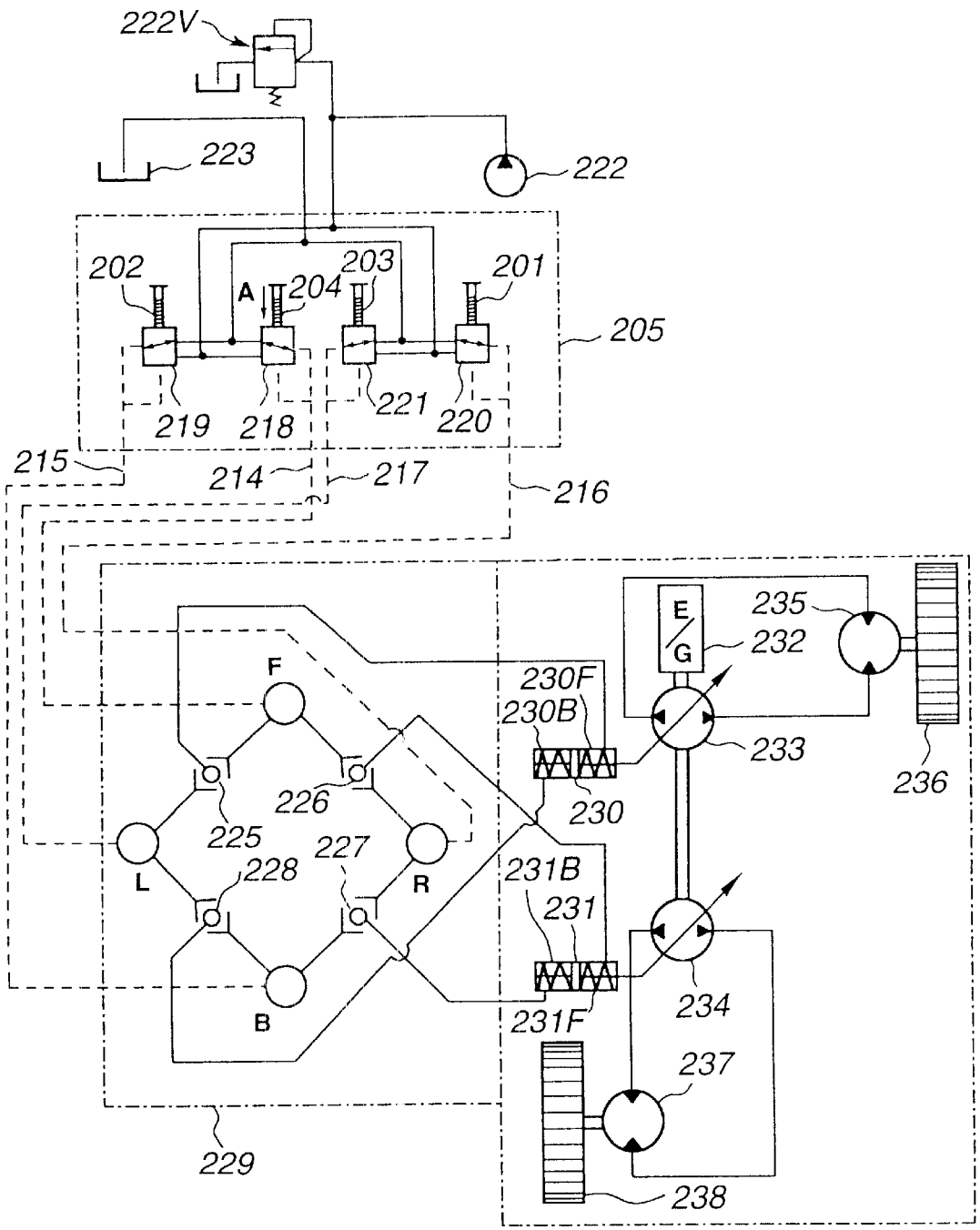
FIG. 16 is an oil hydraulic circuit diagram showing a conventional driving control device for a vehicle device.
Figure 17A:
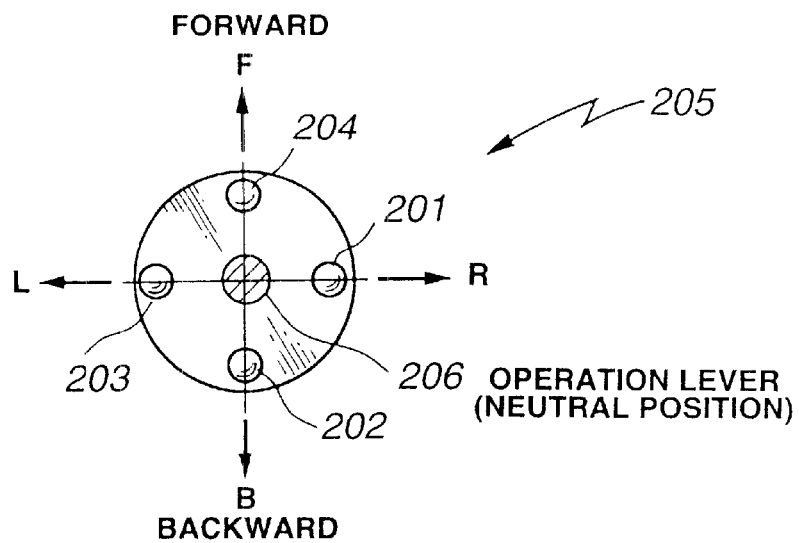
FIGS. 17(a) and 17(b) are diagrams illustrating movements of a vehicle in correspondence with tilted directions of the operation lever device.
Figure 17B:
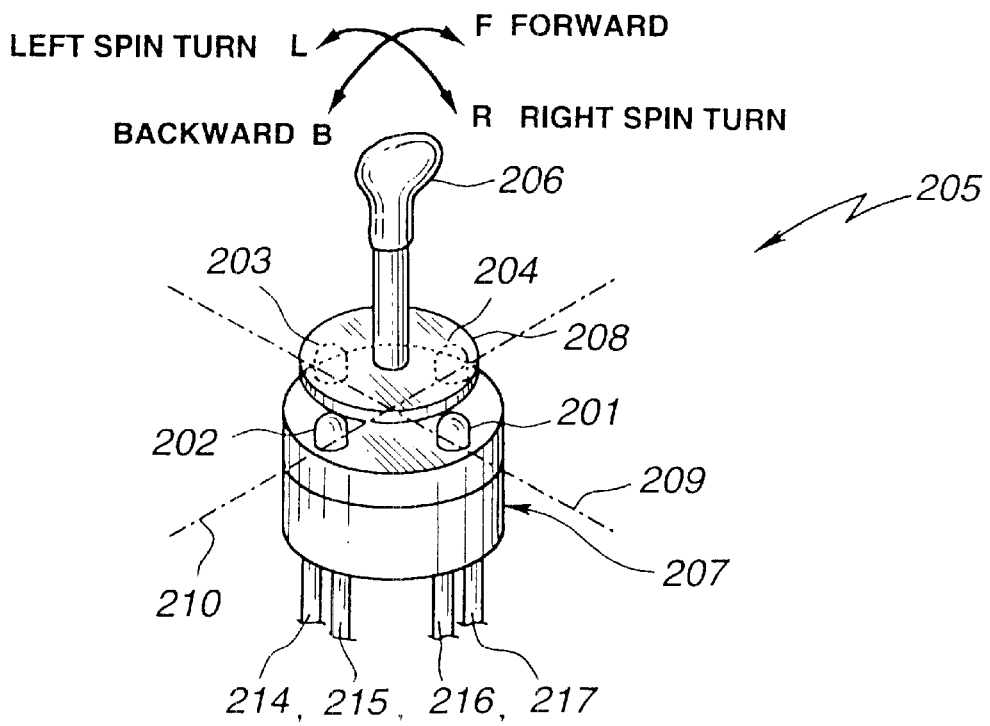
Figure 18:
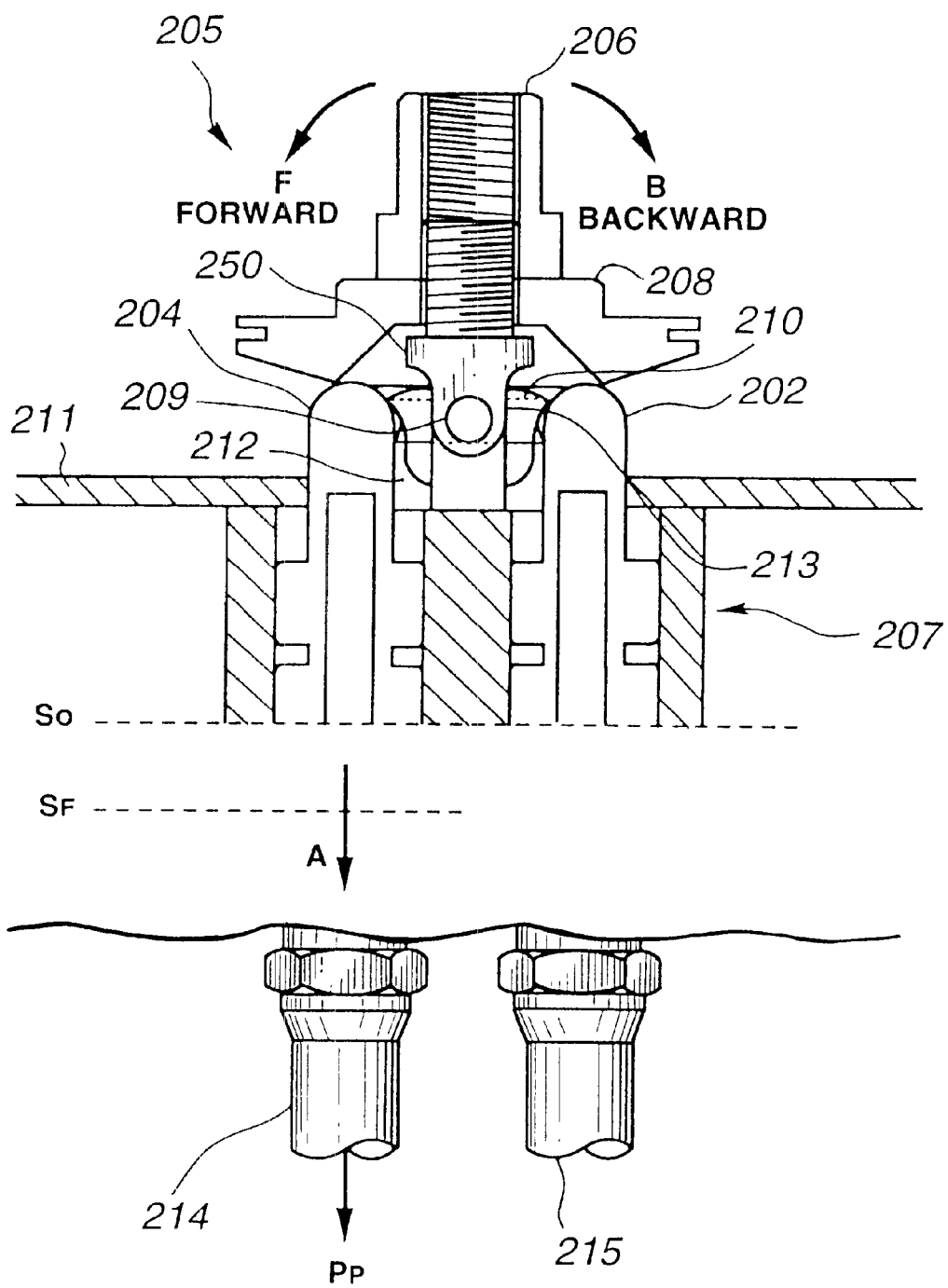
FIG. 18 is a section diagram showing a structure of a conventional operation lever.
Figure 19:
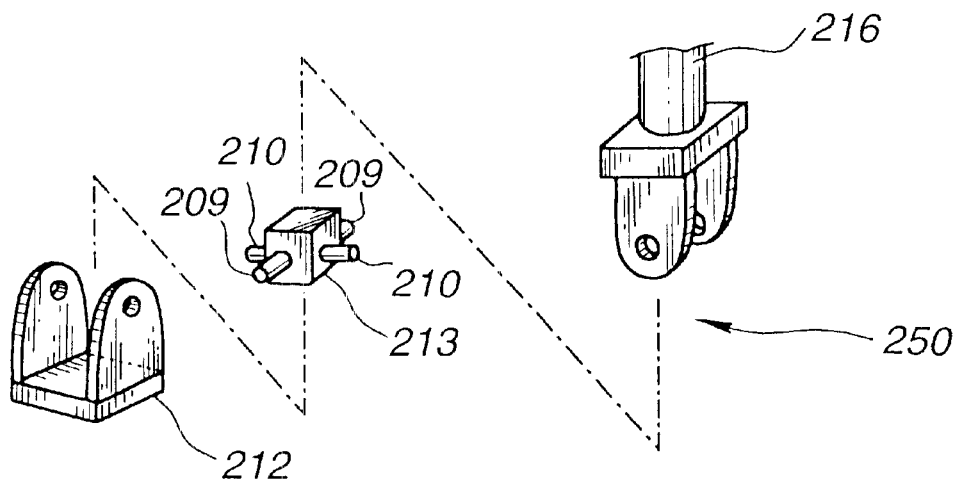
FIG. 19 is a perspective diagram showing a disassembled universal joint.
Figure 20:
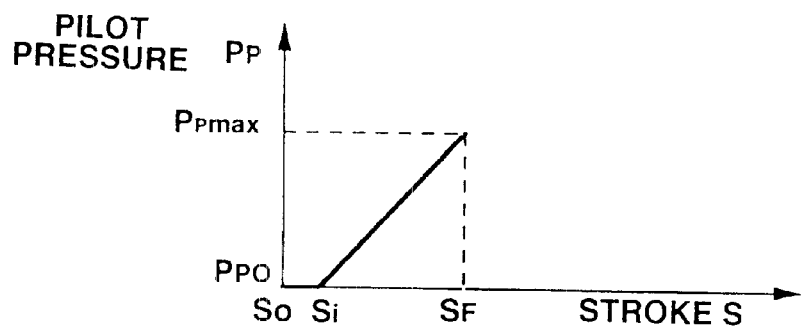
FIG. 20 is a diagram showing a relation between a stroke of a conventional piston and an oil pressure signal.
Figure 21:
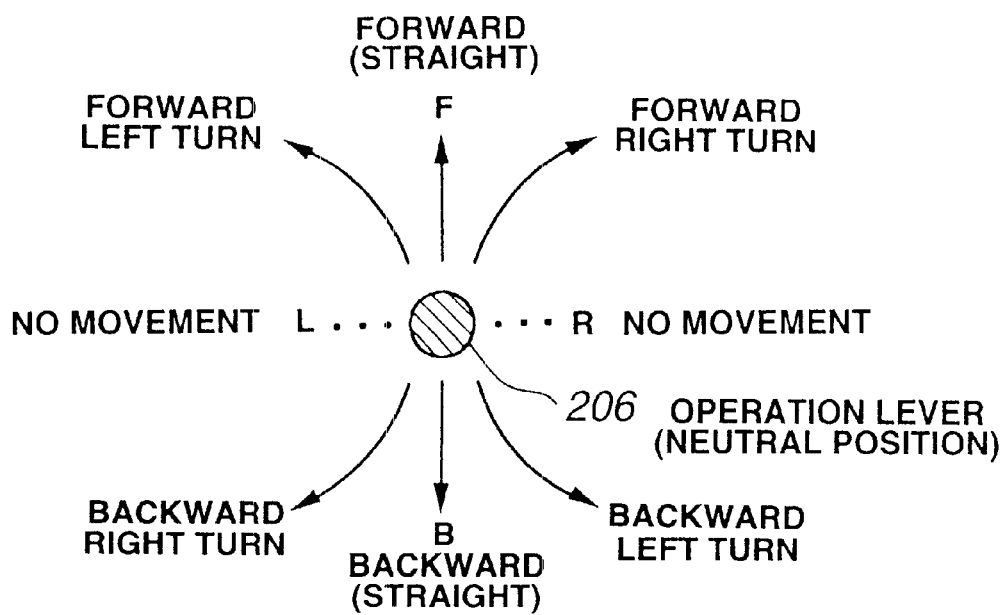
FIG. 21 is a diagram illustrating movements of a vehicle in correspondence with tilted directions of the operation lever.
Figure 22:
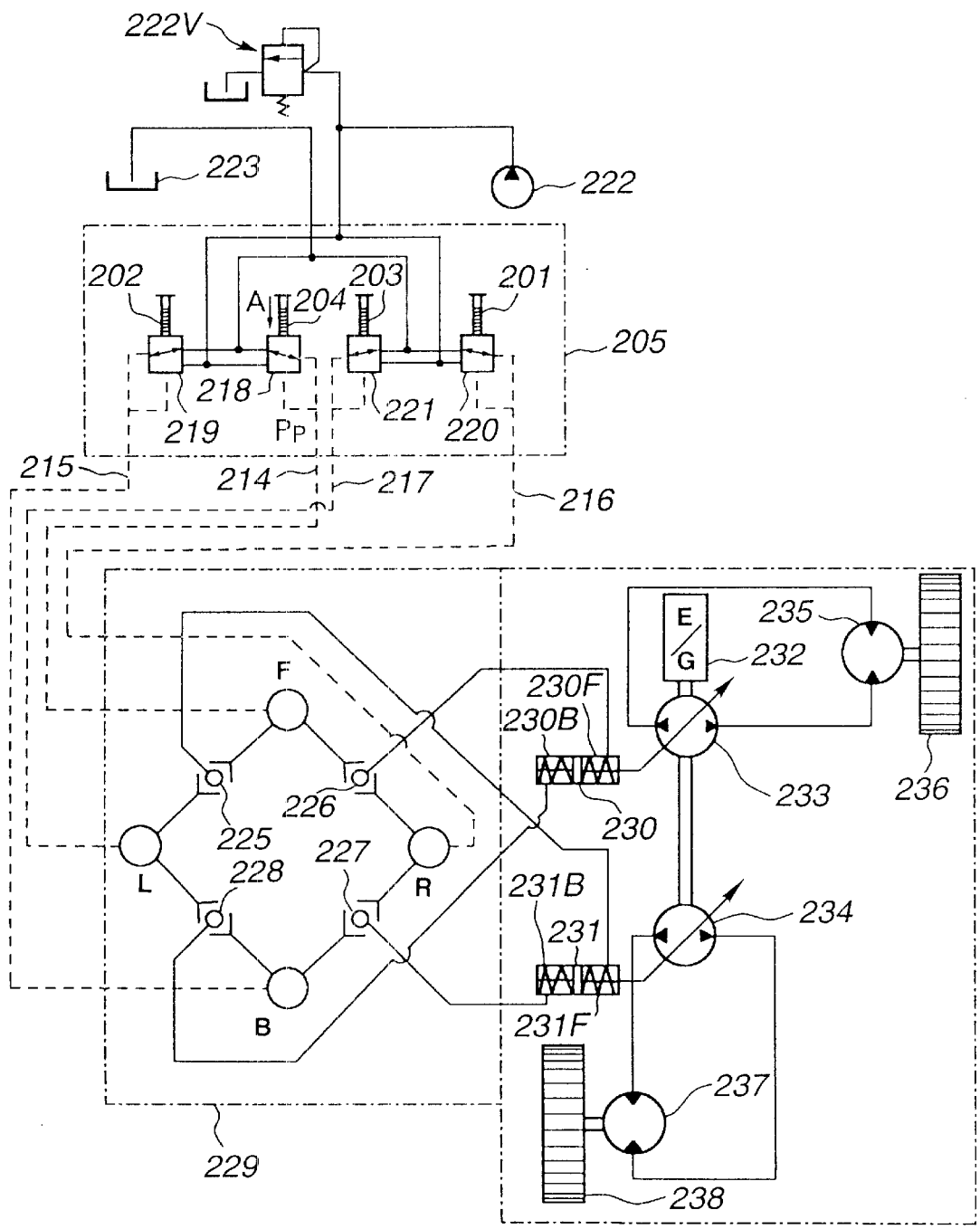
FIG. 22 is an oil hydraulic circuit diagram showing a conventional drive control device for a vehicle device.
Figure 23:
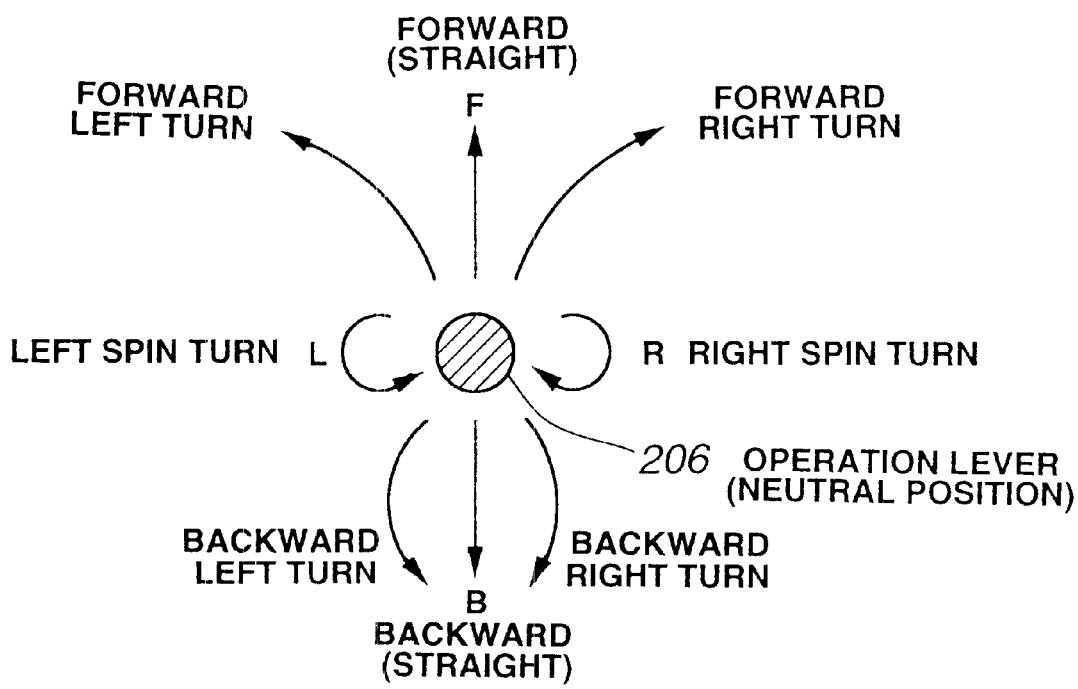
FIG. 23 is a diagram illustrating movements of a vehicle in correspondence with tilted directions of the operation ever.

Specifically, when the operation lever 40 is turned in right direction with the operation button 181 operated as shown in FIG. 15(b), the left traveling hydraulic motor 3L and the right traveling hydraulic motor 3R are controlled to have the same rotation speed but in different rotation directions by the hydraulic motor control means 6 according to an instruction signal from the changeover switch 180 and a control signal from the potentiometer 50X (see FIGS. 2, 3). Thus, the bulldozer (vehicle device) makes a right spin turn.

When the operation lever 40 is rotated to left with the operation button 181 operated as shown in FIG. 15(b), the left traveling hydraulic motor 3L and the right traveling hydraulic motor 3R are controlled to have the same rotation speed but in different rotation directions by the hydraulic motor control means 6 according to an instruction signal from the changeover switch 180 and a control signal from the potentiometer 50X (see FIGS. 2, 3). Thus, the bulldozer (vehicle device) makes a left spin turn.

The spin turn speed at the right spin turn and the left spin turn described above is designed to increase in proportion to the tilted amount of the operation lever 40.

The operation lever 40 of the operation lever device 1 is provided with a dead band in a predetermined tilting range from the neutral position. Thus, good operability can be obtained without requiring the delicate operation of the operation lever 40.

The driving control device shown in FIG. 14 may have the changeover switch 180 not on the operation lever 40 of the operation lever device 1 but on an operation panel or the like near the operation lever device 1.

It is also possible to configure the oil hydraulic circuit section of the driving control device shown in FIG. 14 in the same way as the driving control device shown in FIG. 13 to have a so-called open system that the rotation speeds and rotation directions of the crawlers are determines by the control valve disposed between the traveling hydraulic pump and the traveling hydraulic motor.

The aforesaid driving control device can make the spin turn of the vehicle device by tilting the operation lever 40 and operating the changeover switch 180 by following the bull-pattern of the operation lever device 1.

In the respective embodiments described above, the driving control device to which the present invention pertains was mounted on the bulldozer having the crawlers as the traveling device. But, it is to be noted that the driving control device of the present invention can also be applied effectively to various types of vehicle devices which have wheels as the traveling device.

What is claimed is:

1. A driving control device for a vehicle device which has an operation lever device for outputting a signal to instruct a traveling speed and a traveling direction of a vehicle by tilting a single operation lever forward, backward, left and right, and hydraulic motor control means for controlling rotation speeds and rotation directions of two hydraulic motors for driving respective traveling devices on left and right sides of the vehicle body according to the signal from the operation lever device, and which controls the traveling of the vehicle device by operating the operation lever of the operation lever device, wherein the driving control device comprises:

spin turn instruction means which outputs a signal to make the two hydraulic motors have the same rotation speed but in different rotation directions from each other by rotating the operation lever of the operation lever device about its vertical axis.

2. The driving control device for a vehicle device according to claim 1, wherein the spin turn instruction means is provided with a changeover switch to output the signal according to a state of the changeover switch and a tilting operation of the operation lever of the operation lever device.

3. The driving control device for a vehicle device according to claim 1, wherein the spin turn instruction means provides a dead band in a predetermined tilting range from the neutral position of the operation lever of the operation lever device.

4. A driving control device for a vehicle device which has an operation lever device for outputting a signal to instruct a traveling speed and a traveling direction of a vehicle by tilting a single operation lever forward, backward, left and right, and hydraulic motor control means for controlling rotation speeds and rotation directions of two hydraulic motors for driving respective traveling devices on left and right sides of the vehicle body according to the signal from the operation lever device, and which controls the traveling of the vehicle device by operating the operation lever of the operation lever device, the driving control device further comprising spin turn instruction means which outputs a signal to make the two hydraulic motors have the same rotation speed but in different rotation directions from each other by rotating the operation lever of the operation lever device, and the spin turn instruction means outputs the signal only when the operation lever of the operation lever device is in a neutral position with respect to tilting directions.

* * * * *